US009050527B2

(12) United States Patent
Loose et al.

(10) Patent No.: US 9,050,527 B2
(45) Date of Patent: Jun. 9, 2015

(54) INTERACTIVE TETHER USING TENSION AND FEEDBACK

(71) Applicant: WMS Gaming Inc., Waukegan, IL (US)

(72) Inventors: Timothy C. Loose, Chicago, IL (US); Christopher W. Chudek, Evanston, IL (US); Scott A. Massing, Lincolnwood, IL (US); Jesse Smith, Chicago, IL (US); Walter E. Smolucha, Melrose Park, IL (US); Craig J. Sylla, Round Lake, IL (US); Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 186 days.

(21) Appl. No.: 13/762,578

(22) Filed: Feb. 8, 2013

(65) Prior Publication Data

US 2014/0057721 A1 Feb. 27, 2014

Related U.S. Application Data

(60) Provisional application No. 61/692,304, filed on Aug. 23, 2012.

(51) Int. Cl.

*A63F 9/24* (2006.01)
*A63F 13/219* (2014.01)
*G07F 17/32* (2006.01)

(52) U.S. Cl.

CPC ............ *A63F 13/04* (2013.01); *G07F 17/3209* (2013.01)

(58) Field of Classification Search

CPC . G06F 3/016; G06F 3/0346; G06F 2203/015; G06F 2203/013; A63F 2300/1037; A63F 13/04; G07F 17/3209

USPC ........................................................... 463/37

See application file for complete search history.

(56) References Cited

U.S. PATENT DOCUMENTS 3,618,897 A 11/1971 Swoboda, Jr. et al.
4,537,364 A 8/1985 Pollman et al.

(Continued)

FOREIGN PATENT DOCUMENTS

WO WO/95/20788 A1 8/1995
WO WO/2006/017926 A1 2/2006

(Continued)

OTHER PUBLICATIONS

Sandia National Laboratories, Novint 3D Haptics Technology Software; R&D 100 Award Entry 2007; (58 pages).

*Primary Examiner* — Dmitry Suhol
*Assistant Examiner* — Carl V Larsen
(74) *Attorney, Agent, or Firm* — Nixon Peabody LLP

(57) ABSTRACT

A wand-shaped handheld device tethered to a fixed structure in a gaming system by one or more cables wound around reels. The handheld device includes a button on a top thereof as a secondary input means. Motors coupled to the reels wind the cables or apply an opposing force to a pulling force applied to the device. Sensors detect how far the cables are retracted or pulled relative to the fixed structure. Haptic feedback devices impart tactile vibrations that are transmitted along the cable(s) and to the handheld device as the motor is pulling the handheld device toward the fixed structure or a player grasping the device is pulling it away from the fixed structure. Wagering game graphics are coordinated with the movement of the device so that movements or selection of the graphics are affected by inputs made by moving the handheld device or pressing its button.

26 Claims, 17 Drawing Sheets

(56) References Cited

U.S. PATENT DOCUMENTS

| | | | | |
|---|---|---|---|---|
| 5,709,219 | A | 1/1998 | Chen et al. | |
| 6,148,094 | A * | 11/2000 | Kinsella | 382/124 |
| 6,377,011 | B1 | 4/2002 | Ben-Ur | |
| 6,380,925 | B1 | 4/2002 | Martin et al. | |
| 6,396,232 | B2 | 5/2002 | Haanpaa et al. | |
| 7,204,168 | B2 | 4/2007 | Najafi et al. | |
| 7,714,836 | B2 | 5/2010 | Rodomista et al. | |
| 7,753,642 | B2 | 7/2010 | Bosscher et al. | |
| 7,880,717 | B2 * | 2/2011 | Berkley et al. | 345/156 |
| 8,123,740 | B2 | 2/2012 | Madhani et al. | |
| 2004/0166937 | A1 * | 8/2004 | Rothschild et al. | 463/36 |
| 2006/0040735 | A1 * | 2/2006 | Baerlocher | 463/26 |
| 2007/0140095 | A1 | 6/2007 | Rast | |
| 2007/0171199 | A1 | 7/2007 | Gosselin | |
| 2007/0266817 | A1 | 11/2007 | Lassiter | |
| 2008/0000317 | A1 | 1/2008 | Patton et al. | |
| 2008/0009771 | A1 | 1/2008 | Perry et al. | |
| 2008/0143895 | A1 * | 6/2008 | Peterka et al. | 349/15 |
| 2008/0184836 | A1 | 8/2008 | Riwan | |
| 2008/0195145 | A1 | 8/2008 | Bonutti et al. | |
| 2008/0291161 | A1 | 11/2008 | Massie et al. | |
| 2008/0304935 | A1 | 12/2008 | Scott et al. | |
| 2009/0138025 | A1 | 5/2009 | Stahler et al. | |
| 2009/0163929 | A1 | 6/2009 | Yeung et al. | |
| 2009/0248038 | A1 | 10/2009 | Blumenkranz et al. | |
| 2010/0106194 | A1 | 4/2010 | Bonutti et al. | |
| 2010/0243344 | A1 | 9/2010 | Wyrobek et al. | |
| 2010/0256815 | A1 | 10/2010 | Salisbury et al. | |
| 2010/0279255 | A1 | 11/2010 | Williams, II | |
| 2011/0003656 | A1 | 1/2011 | Bennett et al. | |
| 2011/0213383 | A1 | 9/2011 | Lee et al. | |
| 2011/0282359 | A1 | 11/2011 | Duval | |
| 2011/0295253 | A1 | 12/2011 | Bonutti et al. | |
| 2012/0003287 | A1 | 1/2012 | Schlossman et al. | |
| 2012/0019440 | A1 | 1/2012 | Berkley et al. | |
| 2012/0075168 | A1 | 3/2012 | Osterhout et al. | |
| 2012/0083654 | A1 | 4/2012 | Cooper et al. | |

FOREIGN PATENT DOCUMENTS

| | | | |
|---|---|---|---|
| WO | WO/2009/097461 | A1 | 8/2009 |
| WO | WO/2012/015659 | A2 | 2/2012 |
| WO | WO/2012/027581 | A2 | 3/2012 |

* cited by examiner

FIG. 13C
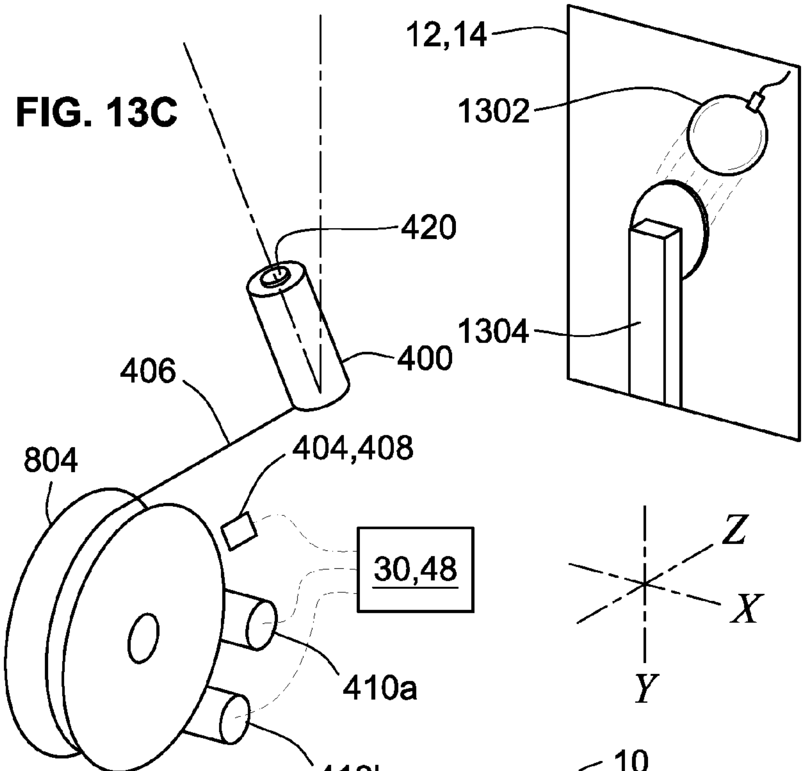
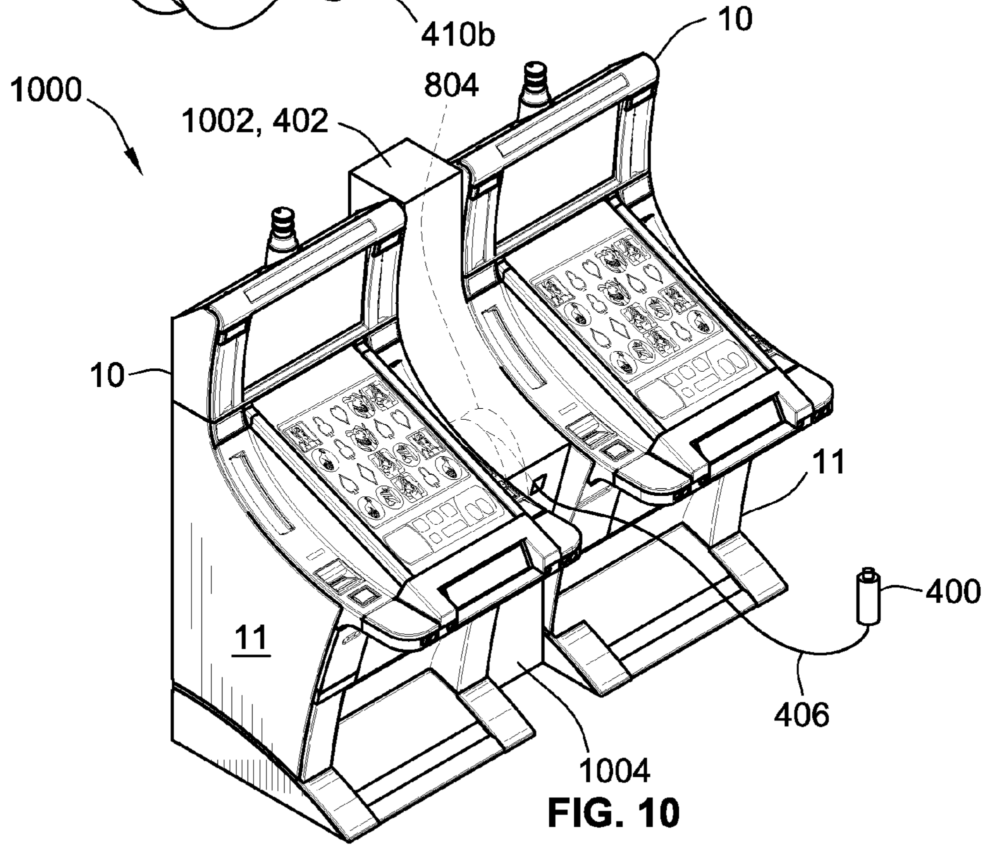
FIG. 10

INTERACTIVE TETHER USING TENSION AND FEEDBACK

CROSS-REFERENCE TO RELATED APPLICATION

This application claims the benefit of U.S. Provisional Patent Application No. 61/692,304, filed Aug. 23, 2012, entitled "Interactive Tether Using Tension and Feedback".

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to wagering games, and methods for playing wagering games, and more particularly, to a handheld device that is tethered to a fixed structure by a cable to which haptic feedback is imparted along the cable to the handheld device during play of a wagering game.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY

According to an aspect of the present disclosure, a gaming system is provided, which includes: a fixed structure; an input device; one or more display devices; a processor; a memory device storing instructions that, when executed by the processor or another processor, cause the gaming system to receive, via at least one of the one or more input devices, an input indicative of a wager and to display, via the one or more display devices, at least a portion of a wagering game; a handheld device connected to a first cable that is coupled to the fixed structure; a first sensor coupled to the first cable or to the handheld device and configured to sense at least one of a movement or an orientation of the handheld device; and a haptic feedback device coupled to the first cable, the haptic feedback device being configured to, under control of the processor or another processor of the gaming system, impart haptic feedback to the first cable that is transmitted by the first cable to the handheld device.

The haptic feedback can include a tension applied to the first cable that causes the first cable to be urged toward the fixed structure and away from an opposing pulling force applied to the handheld device. The instructions can further cause the gaming system to impart the haptic feedback simultaneously with the first sensor sensing the movement of the handheld device. The instructions can further cause the gaming system to display on the one or more display devices a graphic related to the wagering game and whose movement appears to be influenced by the movement of the handheld device. The movement of the graphic can be coordinated with the movement of the handheld device. The graphic can be a symbol associated with a randomly determined outcome of the wagering game. The graphic can represent an object that interacts with a symbol of the wagering game. The symbol can be associated with a randomly selected outcome of the wagering game.

The first cable can be retractable. The gaming system can further include a first motor coupled to the first cable and a first take-up reel around which the first cable is wound as the first motor rotates the first reel or is unwound as the handheld device is pulled. The first sensor can be a position sensor integrated with the first motor. The first motor can be configured to rotate against a direction in which the first cable is being pulled to resist a pulling force applied on the first cable by the handheld device.

The gaming system can further include a first motor coupled to the first cable, and the instructions can cause the gaming system to rotate the first motor between a first direction and a second direction opposite the first direction to impart haptic feedback along the first cable to the handheld device.

The fixed structure can be a cabinet of a gaming terminal, the gaming terminal housing the input device and the display device. Alternately, the fixed structure can be a spacer adjacent to a cabinet of a gaming terminal that houses the input device and the display device. The spacer can have a housing that is distinct from the cabinet of the gaming terminal.

The first sensor can be an inertial sensor in the handheld device. The orientation of the handheld device can be detected by the inertial sensor and communicated to the processor or another processor of the gaming system. The orientation can be communicated along the first cable from the handheld device toward the processor or another processor of the gaming system.

The handheld device can include a base and a top section that articulates about a pivot coupled to the base. The handheld device can further include sensors coupled to corresponding cables such that articulation of the top section about the pivot causes tension to be applied to selected ones of the cables to detect, via the sensors, a pulling or a pushing motion applied to the top section.

The gaming system can further include a second cable connected to the handheld device and a second sensor coupled to the second cable. The instructions can further cause the gaming system to display on the display device a graphic, cause the graphic to appear to move according to a first movement in response to the first and the second cables being urged in the same direction as sensed by the first and second sensors, cause the graphic to appear to move according to a second movement different from the first movement in response to the first and the second cables being urged in opposite directions as sensed by the first and second sensors. The first and second cables can be urged in the same direction by the handheld device being pulled away from the fixed structure. The gaming system can further include a second motor coupled to the second cable and a second take-up reel around which the second cable is wound as the second motor rotates the second reel or is unwound as the handheld device is pulled. The first and second cables can be urged in the same direction by the first motor and the second motor rotating in a direction that causes the first and second cables to be wound around respective ones of the first and the second take-up reels. The first movement and the second movement can include at least one of a direction, a pitch, a yaw, or a roll of the graphic.

The instructions can further cause the gaming system to display a graphic on the display device, and to cause the graphic to appear to move according to the movement of the handheld device sensed by the first sensor. The graphic can correspond to a symbol of the wagering game, the symbol being associated with a randomly determined outcome of the wagering game.

The handheld device can include a button, and the instructions can further cause the gaming system to receive an indication of a press of the button as an input to the wagering game. The instructions can further cause the gaming system to display on the one or more display devices a graphic whose movement is influenced by a pushing or pulling of the handheld device relative to the fixed structure until the indication of the press of the button is received, thereby selecting the graphic or another symbol of the wagering game.

The handheld device can include a pressure sensitive pad configured to detect a pressure applied by a hand grasping or holding the handheld device and to communicate pressure information indicative of the applied pressure to the processor or another processor. The instructions can further cause the gaming system to select a symbol of the wagering game responsive to receiving the pressure information.

The gaming system can further include a second handheld device connected to a second cable that is coupled to the fixed structure or to another fixed structure and a second sensor coupled to the second cable or to the second handheld device and configured to sense at least one of a movement or an orientation of the second handheld device. The instructions can further cause the gaming system to display on the one or more devices a graphic that is influenced by the movement of the handheld device and by the movement of the second handheld device.

The instructions can further cause the gaming system to compare the movement sensed by the first sensor with the movement sensed by the second sensor to determine a movement of the graphic on the one or more display devices. The handheld device can be grasped by a first player at a first gaming terminal of the gaming system and the second handheld device is grasped by a second player at a second gaming terminal of the gaming system. The wagering game can be a multi-player wagering game.

The instructions can further cause the gaming system to detect, using the first sensor, when the movement of the handheld device causes the handheld device to be outside a predefined zone, and responsive thereto, terminate play by a player grasping the handheld device of the wagering game. The instructions can further cause the gaming system to detect, using the first sensor, a constant tension applied to the first cable by the handheld device as a requirement to play the wagering game, and responsive to detecting a loss of the tension, cause the gaming system to terminate the play of the wagering game.

According to another implementation of the present disclosure, there is disclosed a method of imparting haptic feedback along a cable connected to a handheld device used to play a wagering game on a gaming terminal. The method includes the steps of: coupling a first cable to a fixed structure; connecting the first cable to the handheld device; receiving, using a controller, an input indicative of a wager to play the wagering game; sensing a movement or an orientation of the handheld device using a first sensor coupled to the first cable or to the handheld device; causing the wagering game to be displayed on one or more display devices; and imparting haptic feedback, using the controller or another controller, to the first cable during the wagering game such that the haptic feedback is transmitted by the first cable to the handheld device.

The method can include any of the steps, functions, or methods listed above, such as those carried out or embodied in the instructions. For example, the haptic feedback can be imparted simultaneously with the sensing the movement or the orientation of the handheld device. The method can further cause to be displayed on the one or more display devices a graphic related to the wagering game and whose movement appears to be influenced by the movement of the handheld device such that the movement of the graphic is coordinated with the movement of the handheld device.

The method include retracting the first cable by a first motor such that the first cable is wound around a first take-up reel or extending the first cable by the first motor to cause the first cable to be unwound from the first take-up reel. The method can further include rotating the first motor against a direction in which the first cable is pulled to resist a pulling force applied on the first cable by the handheld device.

According to still another implementation of the present disclosure, there is disclosed one or more physical machine-readable storage media including instructions which, when executed by one or more processors, cause the one or more processors to perform operations. The operations can include any of the steps, functions, or methods disclosed above, such as those carried out or embodied in the instructions.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 10 is a perspective illustration of two gaming terminals separated by a spacer to which a handheld device is tethered by a cable according to aspects of the present disclosure.

FIGS. 13A-13C are illustrations of a sequence of movements by a handheld device connected by a cable in which the handheld device is tilted to influence a graphic displayed on one or more display areas.

Figure 1:
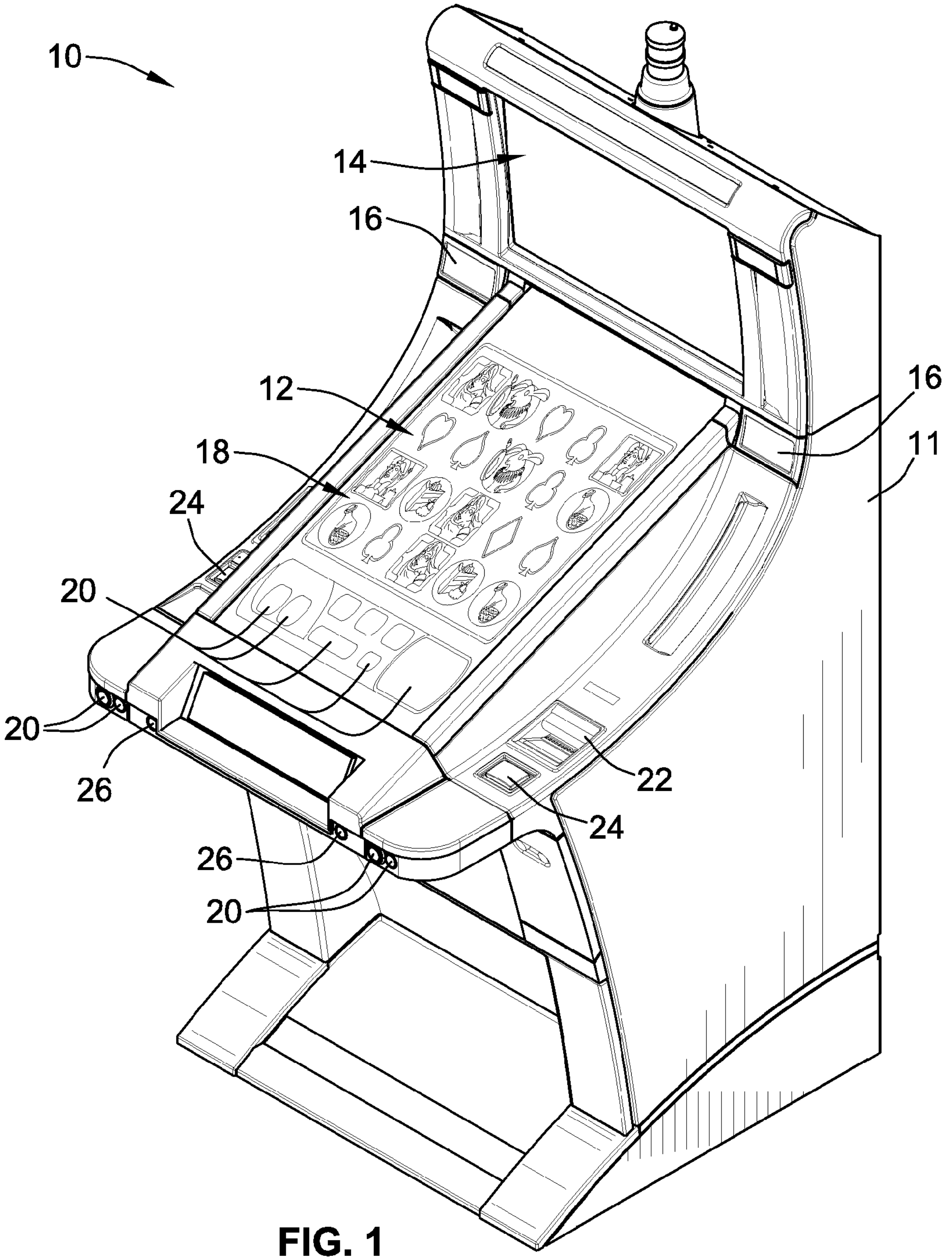
FIG. 1 is a perspective view of a free-standing gaming terminal according to an embodiment of the present disclosure.

While this disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

While this disclosure is susceptible of embodiment in many different forms, there is shown in the drawings and will herein be described in detail preferred embodiments of the disclosure with the understanding that the present disclosure is to be considered as an exemplification of the principles of the disclosure and is not intended to limit the broad aspect of the disclosure to the embodiments illustrated. For purposes of the present detailed description, the singular includes the plural and vice versa (unless specifically disclaimed); the word "or" shall be both conjunctive and disjunctive such that A "or" B shall mean A only, B only, or A and B; the word "all" means "any and all"; the word "any" means "any and all"; and the word "including" means "including without limitation." The article "a" or "an," unless explicitly stated otherwise, shall mean "at least one" or "one or more." There is no difference in meaning among the terms "one or more," "at least one," "a," or "an." Reference numbers that include letter suffixes refer to like components or modules and can be referred generally by their numerical reference (without a letter suffix) to refer to any combination or all of the like components or modules to which the reference numbers with letter suffixes refer.

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
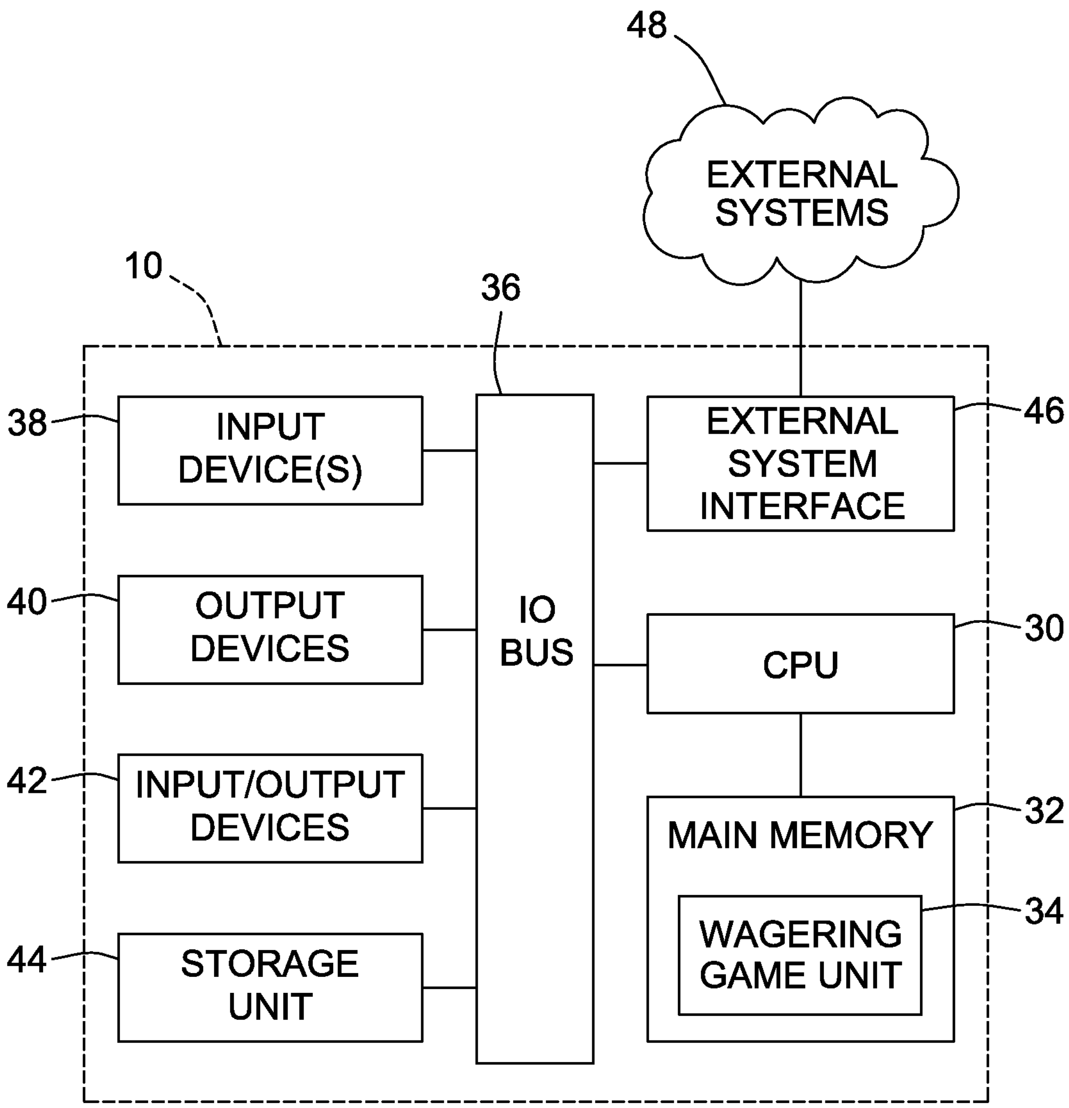
FIG. 2 (PRIOR ART)
FIG. 2 is a schematic view of a gaming system according to an embodiment of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
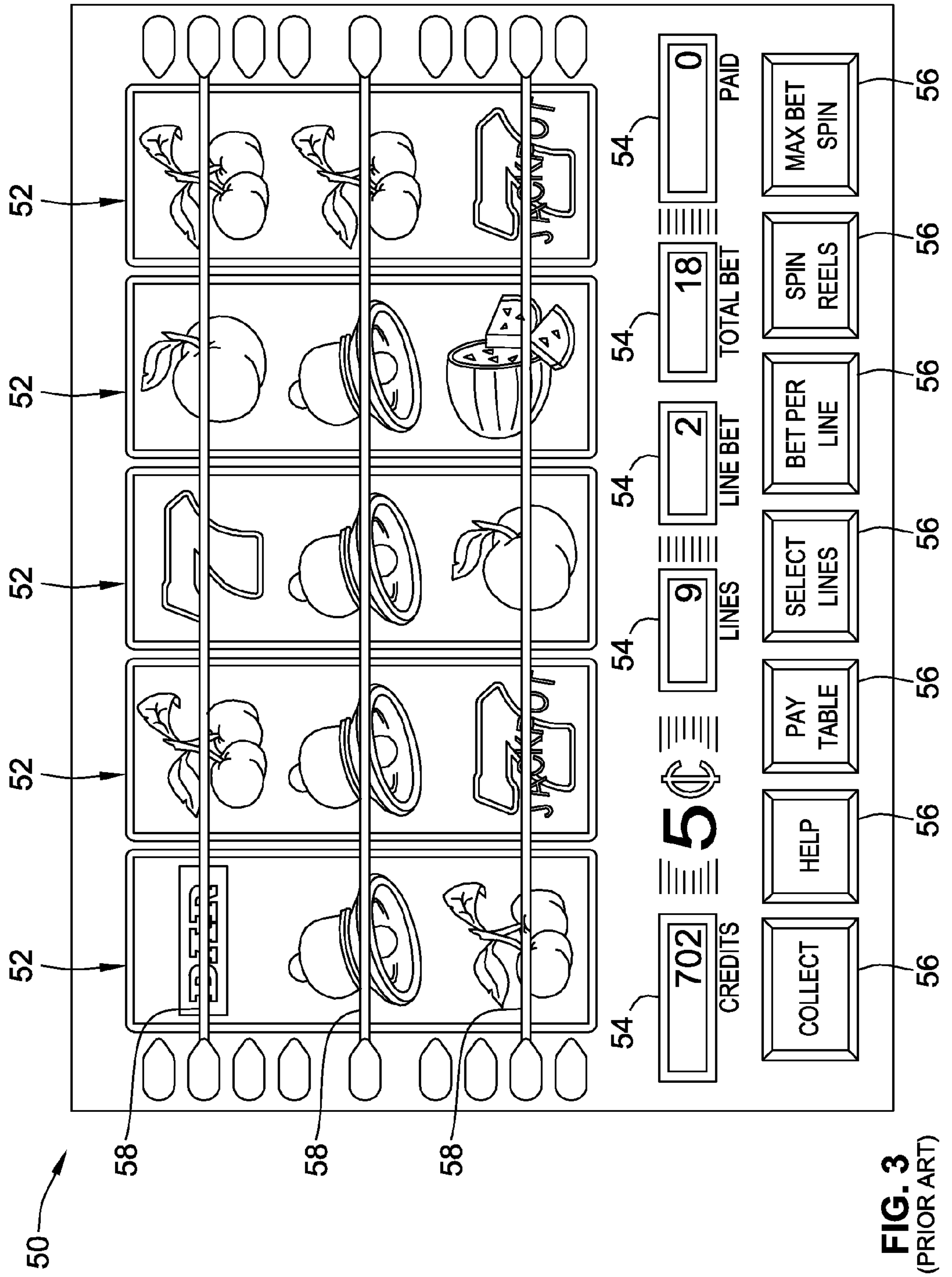
FIG. 3 (PRIOR ART)
FIG. 3 is an image of an exemplary basic-game screen of a wagering game displayed on a gaming terminal, according to an embodiment of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
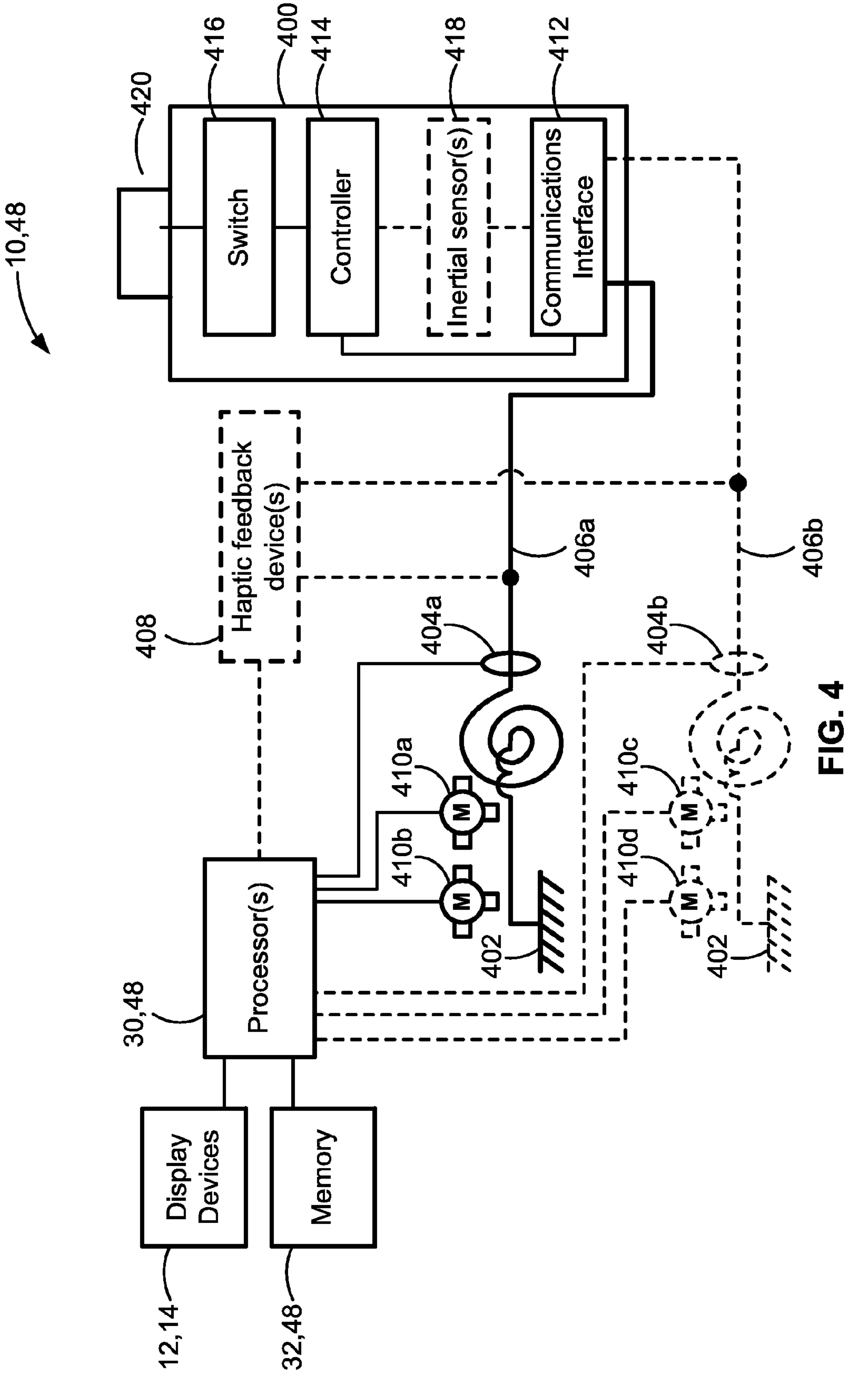
FIG. 4 is a functional block diagram of an example gaming system including a handheld device connected to a fixed structure by a cable according to aspects of the present disclosure.

Referring now to FIG. 4, a functional block diagram of an example gaming terminal 10 or an external system 48 is shown, including a handheld device 400 according to aspects of the present disclosure. The handheld device 400 has a size and a weight sufficient to be held in or grasped by an average adult human's (left or right) hand. While the present disclosure is not intended to be limited to any specific form factor, the handheld device 400 can be cylindrical-shaped (e.g., FIG. 5) such as wand-shaped or have a round portion that can be grasped, such as shown in the figures that follow. However, it should be emphasized that these form factors are merely exemplary of the many form factors that can be made to be readily grasped or held by a human's hand. The reference number 400 shall be used herein to refer to any handheld device described herein.

As shown in FIG. 4, the handheld device 400 is connected to a first cable 406*a* that is coupled to a fixed structure or anchor 402. The fixed structure 402 can be any structure such as an anchor that allows the first cable 406*a* to be in tension or relaxed relative thereto. Examples of these fixed structures will be described below, and include a frame or other fixed structure such as within the cabinet 11 of a gaming terminal like the gaming terminal 10, or an armrest as described in connection with FIGS. 6B, 7B, and 7C, to name a few examples among others. The first cable 406*a* can include one or more conductors, one, some or none of which can carry power or data signals between the handheld device 400 and other components of the gaming terminal 10 or the external system 48. In its most basic form, the first cable 406*a* can be a tethering device, conductive or non-conductive, that prevents the handheld device 400 from being readily untethered from the gaming terminal 10 with which it is associated. In implementations in which data is communicated over wires between the handheld device 400 and the system 48 to which it is tethered, the first cable 406*a* can be configured to carry data or power or both data and power via one or more conductors of the first cable 406*a*. Alternately, the data and/or power signals can be carried over conductors that are separate from the first cable 406*a* and accessible from a connector port on the gaming terminal 10, for example.

The handheld device 400 can include an optional button 420, which can be a pushbutton coupled to a switch 416 that indicates a state of the button 420 (e.g., pressed or unpressed). The switch 416 can output or provide a signal indicating the state of the button to a controller 414, which can communicate the button status information to a communications interface 412. The communications interface 412 can include a wired connector or a wireless transceiver configured to connect one or more conductors that communicate data between the handheld device 400 and other components in the gaming terminal 10 or external system 48. The first cable 406*a* can be configured to include a conductor that carries data between the communications interface 412 of the handheld device 400 and one or more processors 30, 48. The first cable 406*a* is shown as being wound in FIG. 4, though it is not necessary for the first cable 406*a* to be wound. In an implementation described in connection with FIG. 8, for example, the first cable 406*a* can be wound around a take-up reel 804, which is rotated by a motor, such as a motor 410*a,b,c,d* as described below.

The handheld device 400 can optionally include one or more inertial sensors 418 that detect an orientation of the handheld device 400 and provide orientation data indicative of the orientation of the handheld device 400 to the controller 414, which in turn communicates, via the communications interface 412, the orientation data to the one or more processors 30, 48, via, for example, the external system interface 46. The handheld device 400 can include a pressure-sensitive pad to detect a pressure applied by a hand grasping the handheld device 400, and the pressure-sensitive pad communicates pressure information to the controller 414 indicative of a level of pressure applied to the pressure-sensitive pad. This pressure information can be used as an input to a wagering game conducted on the gaming terminal 10, such as, for example, selecting a graphic or symbol of the wagering game. For example, in a wagering game featuring a pick field comprising an array or arrangement of elements or symbols, each associated with a randomly determined outcome of the wagering game, the pressure information can be used to select the elements or the symbols, or they can be selected by the button 420 of the handheld device 400, or by a predetermined movement of the handheld device 400.

An optional second cable 406*b* can be attached to the handheld device 400 and optionally operatively coupled to the communications interface 412. The second cable 406*b* can be configured in a like manner as the first cable 406*a*. Examples of implementations involving multiple cables, such as the first and second cables 406*a*, 406*b*, are described in connection with FIGS. 12A-12D below. Although only two cables 406*a*, 406*b* are shown in FIG. 4, it is contemplated that more than two cables can be attached to the handheld device 400. For example, the number of cables can depend on the number of degrees of freedom of movement desired for the handheld device 400. Note that the optional inertial sensors 418 can also be used to detect orientation or direction of the handheld device 400, such that when used in conjunction with the cables, fewer cables can be used.

Still referring to FIG. 4, the gaming terminal 10 or the external system 48 can further optionally include one or more haptic feedback devices 408, which of which is coupled to the first and second cables 406*a*, 406*b*. For convenience, although there can be multiple haptic feedback devices 408, the singular form shall be used except in implementations that require multiple haptic feedback devices 408. The haptic feedback device 408 can be coupled to the first and second cables 406*a*, 406*b* or to the first cable 406*a* only or to the second cable only 406*b*. The haptic feedback device 408 is coupled to one or more processors 30, 48, which configure the haptic feedback device 408 to impart haptic feedback that is transmitted along the first cable 406*a* and/or the second cable 406*b*.

A first sensor 404*a* and an optional second sensor 404*b* are coupled to the first and second cables 406*a,b*, respectively, or to the fixed structure 402. The sensors 404*a,b* are configured to sense a movement or an orientation (or both) of the handheld device 400. In other words, the sensors 404*a,b* can be external to the handheld device 400 as shown in FIG. 4, such as coupled to the fixed structure 402. When coupled to the cables 406*a,b*, the sensors 404*a,b* can detect a distance that the cables 406*a,b* move relative to a reference point to determine a movement of the handheld device 400. The sensors 404*a,b* can be position sensors incorporated into any of the motors 410*a,b,c,d*, or they can be external to the motors 410*a,b,c,d* and connected to the fixed structure 402 to detect the actual distance that the cables 406*a,b* move. For example, external sensors 404*a,b* can account for motor slippage and report only the distance that the cables 406*a,b* actually move in response to being pulled by the motor(s) 410 or by the handheld device 400.

One or more motors 410*a,b,c,d* (referred to individually or collectively as 410) can be coupled to the first and/or second cables 406*a,b* so that the cables 406*a,b* can be retracted or extended relative to the handheld device 400 under the power of the motor 410 or to apply a resistance force that opposes a pulling force applied to the handheld device 400. In some implementations, a single motor 410 suffices, and can be rotated in either direction to retract or extend the cable 406*a*, 406*b* relative to the handheld device 400 or to apply a parallel or opposing force to a pushing or pulling force applied to or on the handheld device 400. The haptic feedback device 408 can be the motor 410 itself. When the motor 410 also operates as a haptic feedback device 408, the motor 410 can be controlled so as to rotate rapidly between a first direction and a second direction opposite the first direction to impart haptic feedback along the cable 406*a*, 406*b* to the handheld device 400. The rapid back-and-forth rotation of the motor 410 creates a vibration pattern that is transmitted along the cable 406 to the handheld device 400. Because the cable 406 is attached to the handheld device 400, the haptic feedback will be coupled from the cable 406 to the handheld device 400 and sensed tactilely by a hand of the human holding or gasping the handheld device 400.

Alternately, a second motor, such as the motor 410*b* or 410*d*, can be configured to apply haptic feedback to the cable 406*a* or 406*b*. In this implementation, one motor 410*a* operates to retract or extend the cable 406*a* relative to the handheld device 400 or to oppose a pulling or pushing force by the handheld device 400, and the other motor 410*b* is configured to apply, under control of the processor(s) 30, 48, haptic feedback to the cable 406*a*. The motor 410*b* in this configuration can include an irregular mass that is rotated by the motor 410*b* to impart a vibratory pattern on the cable 406*a*. In this aspect, the second motor 410*b* provides the haptic feedback and a separate haptic feedback device 408 is not needed. In other implementations, a haptic feedback device 408, such as any suitable electromechanical actuator, can impart haptic feedback that is transmitted along the cable 406*a*. The same implementations can be applied to the other motors 410*c,d* and the second cable 406*b* when these components are present. Alternately, a rotor of the motor, such as the motor 410*b*, 410*d* can strike a tooth or other structure to cause a chatter or ratcheting action on the cable 406 as the motor 410*a,b,c,d* is rotated.

In all of these aspects, the handheld device 400 is an input device that affects one or more graphics displayed on the display devices 12 or 14. Various exemplary graphical user interfaces between the handheld device 400 and graphics displayed on the display devices 12 or 14 are described below.

Figure 5:
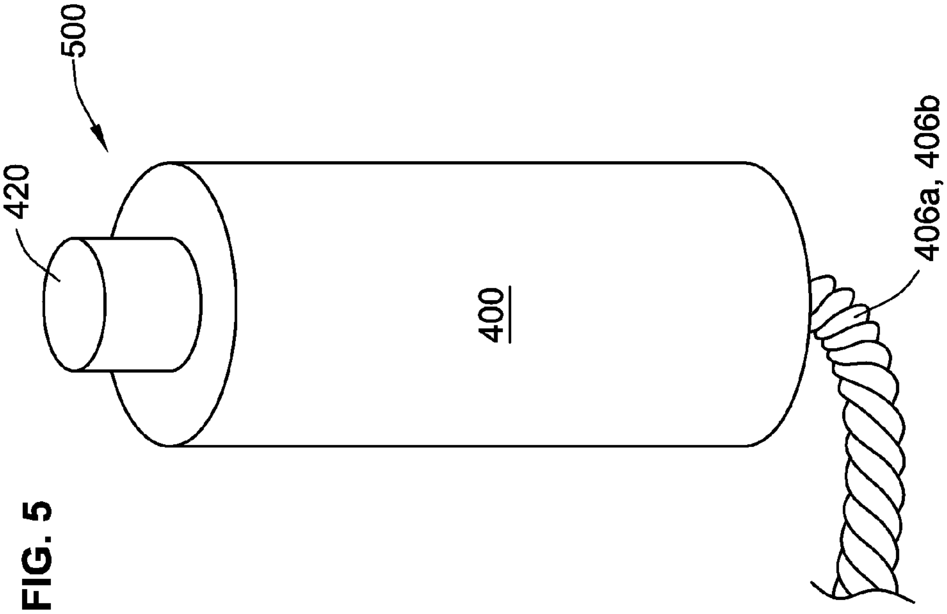
FIG. 5 is a perspective illustration of an example of a handheld device shown in FIG. 4.

FIG. 5 illustrates an exemplary form factor of the handheld 500 having a button 420 on a top and a cable 406*a*, 406*b* extending away from a bottom of the handheld device 500. The handheld device 500 is based on the handheld device 400 described above. In this illustration, the handheld device 500 has an elongated cylindrical form of sufficient length to allow the handheld device 500 to be grasped by an average adult human hand.

Figure 6A:
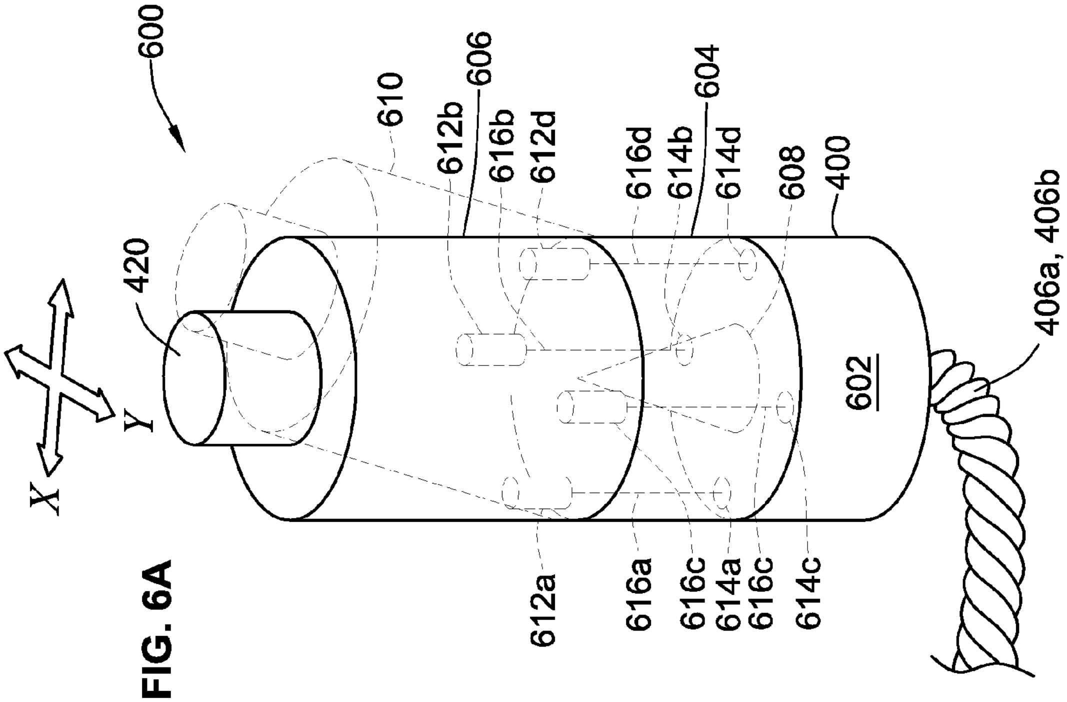
FIG. 6A is a perspective illustration of a handheld device having an articulable top section for sensing pulling and pushing motions by the handheld device.

FIG. 6A illustrates another exemplary form factor of a handheld device 600, which is based on the handheld device 400. In this example, the handheld device 600 also has an elongated cylindrical form and includes three sections, a base 602, a middle section 604, and a top section 606, in which the top section 606 can be jointed or articulated along the X-Y plane as shown to indicate a movement or a direction. Inside the handheld device 600 are four sensors 612*a,b,c,d*, each connected to four corresponding cables 616*a,b,c,d*, which in turn are anchored to corresponding anchors 614*a,b,c,d* in the base 602 of the handheld device 600. A pivot 608 allows the top section 606 to pivot or articulate relative to the middle section 604 as follows. As the top section 606 is urged along the X-direction (to the right of the page) as shown by the new position 610, the cable 616*a* is extended, and this extension is sensed by the sensor 612*a* and transmitted via the communications interface 412 to the cable 406*a,b* or wirelessly to the gaming terminal 10 or external system 48. The four sensors 612*a-d* allow for any direction to be detected along the plane defined by X-Y. Rotation of the top section 606 can also be detected by detecting the sequence of sensors 612 as they detect tension applied to the corresponding cables 616. Advantageously, this configuration of the handheld device 400 detects both pulling and pushing motions by the player holding the handheld device 400.

Figure 6B:
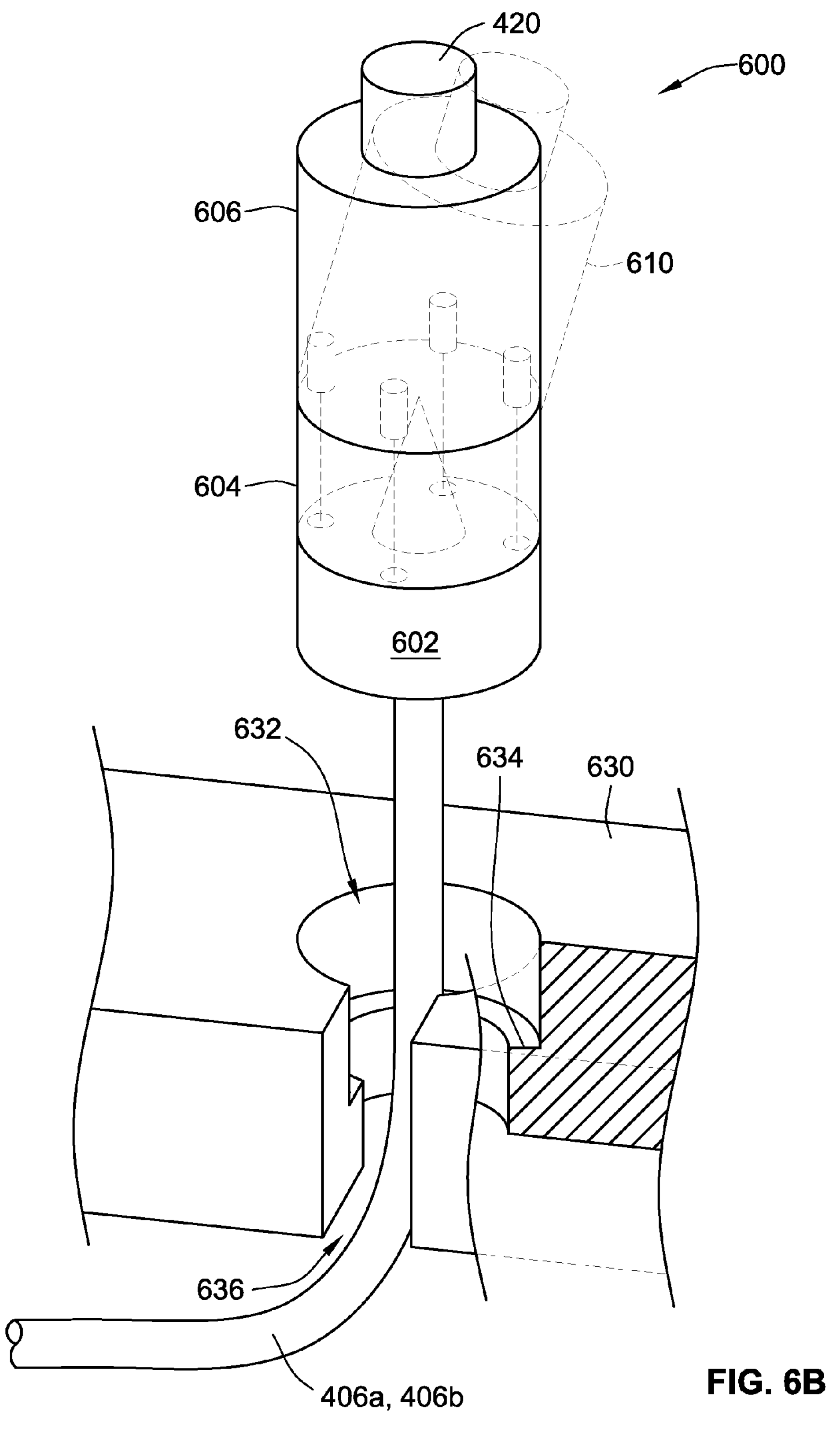
FIG. 6B is a perspective cutaway illustration of an armrest of a chair having a holder for receiving a handheld device according to aspects of the present disclosure.

FIG. 6B illustrates a partial cutaway view of a holder 630 for the handheld device 600 or any handheld device 400 described herein. For example, the holder 630 can be incorporated into an armrest of a chair positioned in front of a gaming terminal 10. Alternately, the holder 630 can be incorporated into a frame or cabinet 11 of a gaming terminal 11. The holder 630 includes an access opening 632 that receives the base 602 of the handheld device 600. The holder 630 further includes a lip 634 against which the base 602 rests when the device 600 is inserted into the access opening 632. A cable opening 636 is formed in the holder 630 to allow the cable 406*a,b* to pass through the opening 636 and protrude in an non-obstructing manner away from the base 602 of the device 600. When the device 600 is inserted into the holder 630, and the base 602 rests against the lip 634, a player grasping the protruding top section 606 of the device 600 can articulate the top section 606 in any direction along a plane defined by a top surface of the holder 630, while the device 600 remains anchored within the holder 630.

Figure 6C:
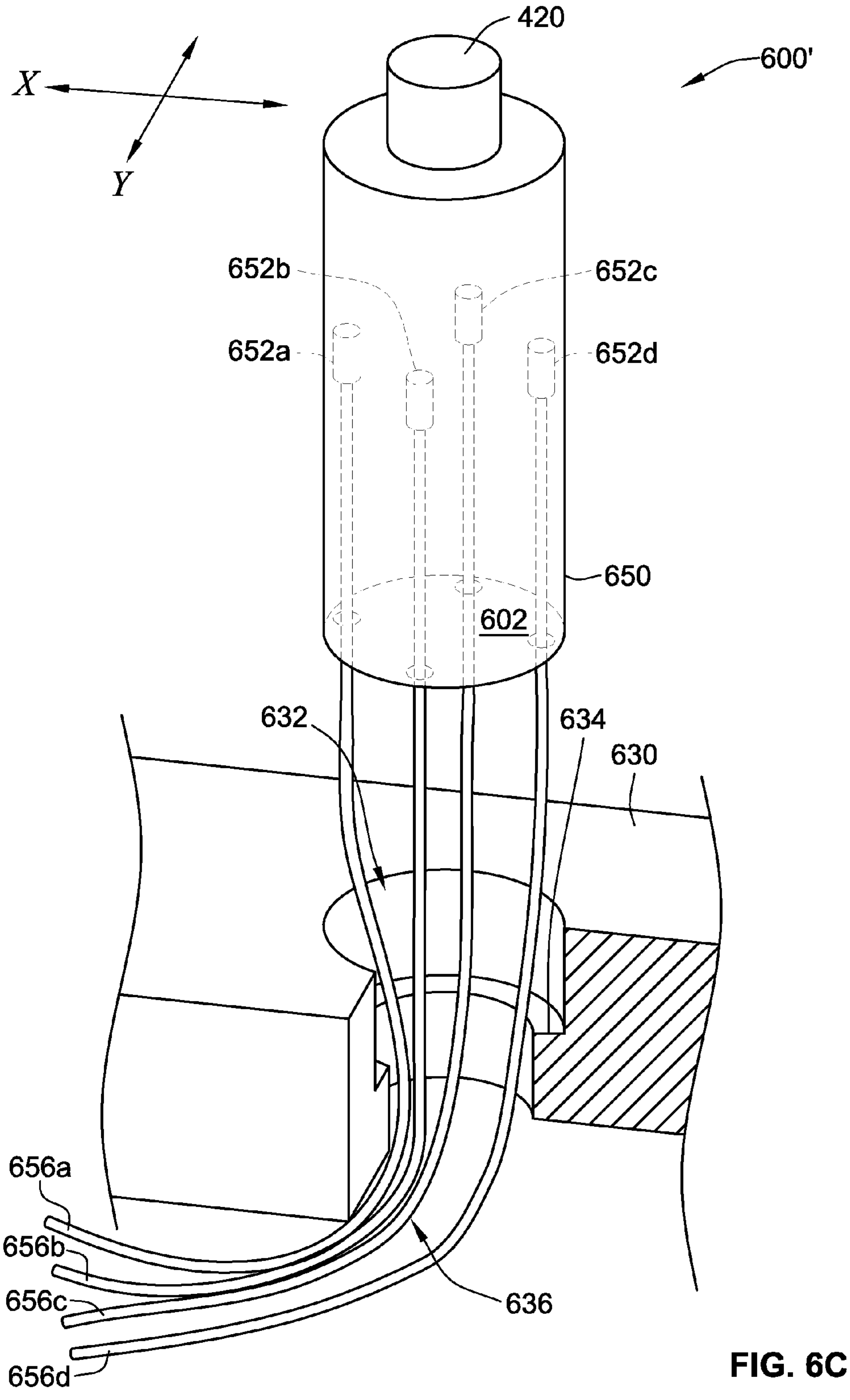
FIG. 6C is a perspective illustration of a handheld device connected to four cables, where the handheld device can be inserted into a holder of an armrest for controlling a movement of a graphic displayed on a video display.

FIG. 6C illustrates a further exemplary form factor of a handheld device 650, which is based on the handheld device 400. In this example, the handheld device 650 has an elongated cylindrical form, and four cables 656*a-d* extending away from the bottom 602 of the handheld device 650 through the cable opening 636 in the holder 630. The cables 656*a-d* are held in tension by anchors 652*a-d*, and when the handheld device 650 is inserted into the holder, it can be articulated along the X-Y axes to control a forward/backward or left/right movement along the plane defined by the X-Y axes. The anchors 652*a-d* can each include a sensor, such as a pressure sensor, configured to sense a tension applied by the corresponding cable 652*a,b,c,d* and convert the sensed tension to corresponding tension data. A difference between the forces applied to each cable 656*a,b,c,d* can be interpreted by the sensors of the anchors 652*a-d* as a twisting of the handheld device 650, or forces applied to all the cables 656*a-d* simultaneously can be interpreted as a movement of the entire handheld device 650. Although four cables 656*a-d* are shown, this example form factor can alternately be implemented using three cables.

Figure 7A:
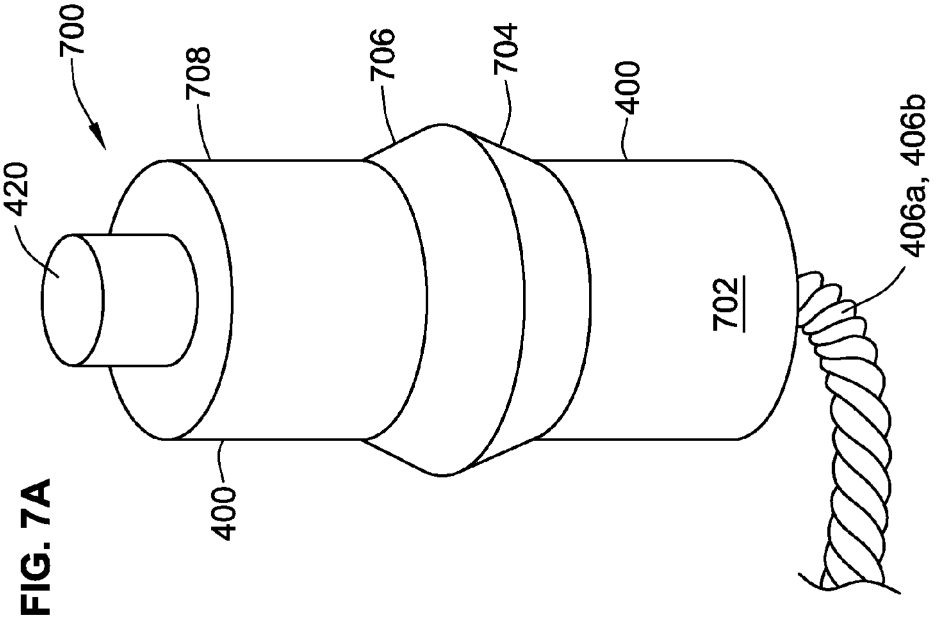
FIG. 7A is a perspective illustration of a handheld device having a beveled protrusion that allows the handheld device to rest within a holder while being pivoted about the beveled protrusion.
Figure 7B:
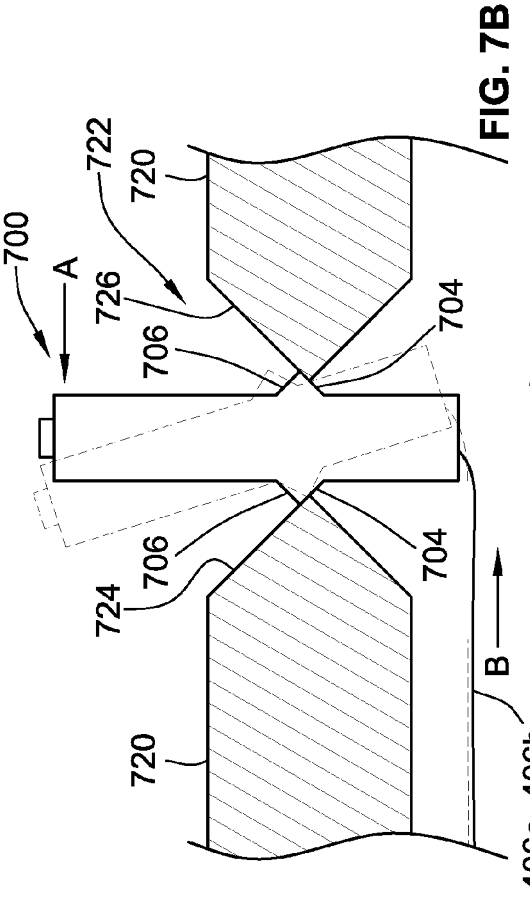
FIG. 7B is a cutaway illustration of the handheld device shown in FIG. 7A being urged in a first direction within the holder.
Figure 7C:
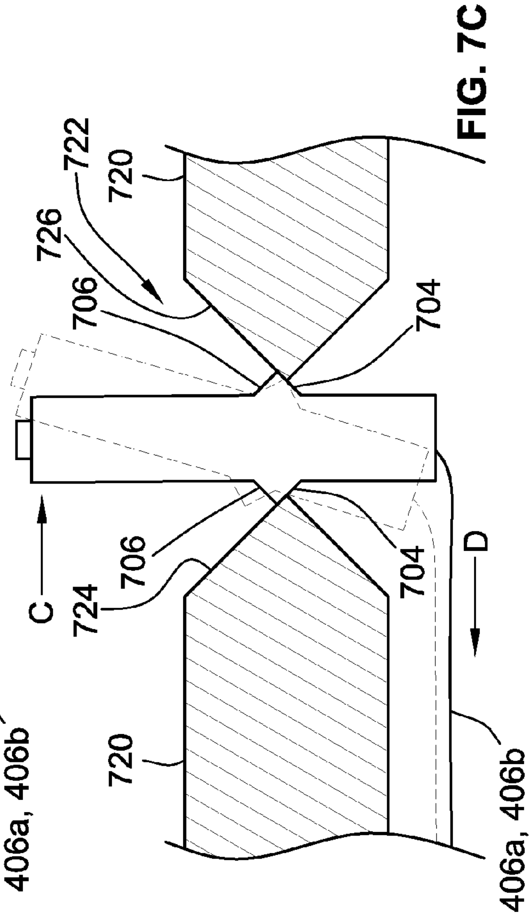
FIG. 7C is a cutaway illustration of the handheld device shown in FIG. 7B being urged in a second direction within the holder.

FIGS. 7A-7C illustrate another form factor of a handheld device 700, which is based on the handheld device 400. This device 700 includes a base 702, a bevel or a chamfer assembly formed by a top bevel or chamfer 704 and a bottom bevel or chamfer 706, each of which protrude away from a surface of the base 702, and a top section 708 out of which an optional button 420 protrudes. In FIG. 7B, a holder 720 is shown as having a recess or cavity 722 defined by two opposing sloped surfaces 724, 726 against which the bottom bevel 704 rests when the device 700 is inserted into the holder 720. The cable 406*a,b* extends below the base 702 and runs to the fixed structure 402. As shown in FIGS. 7B and 7C, the device 700 can be freely rotated within the holder 720. In FIG. 7B, when the device 700 is moved in the direction of arrows A, B, the bottom bevel 704 retains the device 700 in the holder 720, and the device 700 pivots in a first direction while remaining in the holder 720. Similarly, as shown in FIG. 7C, when the device 700 is moved in the direction of arrows C, D, the bottom bevel retains the device 700 in the holder 720, and the device 700 pivots in a second direction different from the first direction while remaining in the holder 720.

Figure 8:
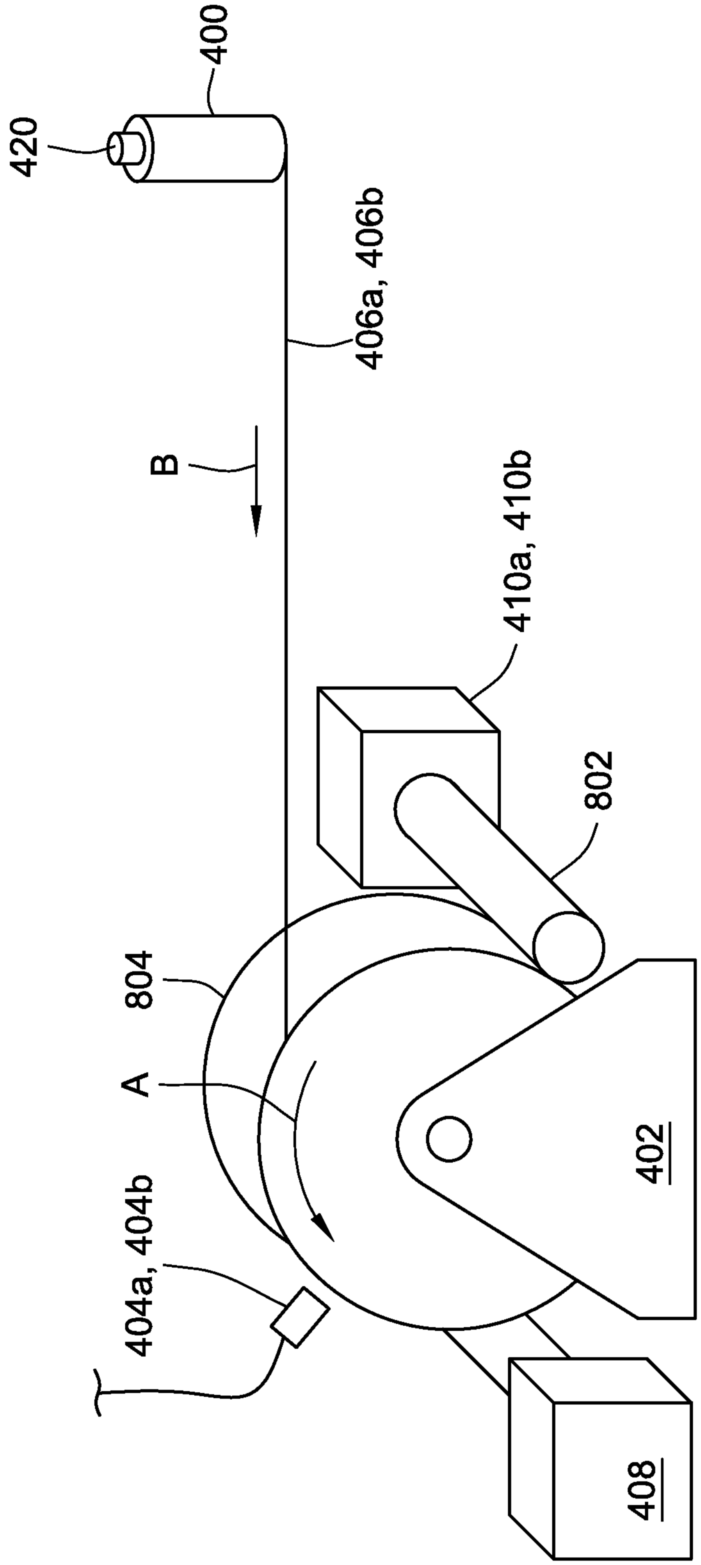
FIG. 8 is a functional diagram of a handheld device connected to a motor by a cable that is wound around a reel according to an aspect of the present disclosure.

FIG. 8 illustrates an example configuration where the fixed structure 402 anchors a reel 804, such as a take-up reel, around which the cable 406*a*, 406*b* is wound. The motor 410*a*,410*b* includes a rotor 802 or a gear that is mechanically coupled to the reel 804 to cause the reel 804 to rotate in a direction opposite of the direction that the motor 410 is rotating. In this example, the cable 406 is retractable. When the handheld device 400 is pulled away from the fixed structure 402, the cable 406 is unwound from the reel 804. The motor 410 can rotate in a direction (indicated by arrow A) that opposes the pulling motion to provide a tactile tugging sensation as the handheld 400 is pulled away from the fixed structure 402 in a direction indicated by arrow B. A sensor 404 can detect the position of the cable 406 to provide an indication to the processor 30, 48 of how far the handheld 400 has been pulled. By contrast, the motor 410 can be controlled such that the rotor 802 causes the reel 804 to wind the cable 406 around the reel 804, thereby pulling the handheld device 400 toward the fixed structure 402. The sensor 404 can indicate how far the handheld device 400 has been pulled. The sensor 404 can be a position sensor, for example, incorporated in the motor 410. An optional haptic feedback device 408 can be coupled to the motor 410 or to the cable 406 to impart haptic feedback (such as by jittering the motor 410) that is transmitted along the cable 406 to the handheld device 400 where it is sensed tactilely by the grasper of the handheld device 400. Alternately, the motor 410 can be rapidly rotated back and forth along the direction B to create a vibration that is transmitted along the cable 406. The frequency of the direction changes can be a function of the intensity of the desired tactile sensation.

Figure 9:
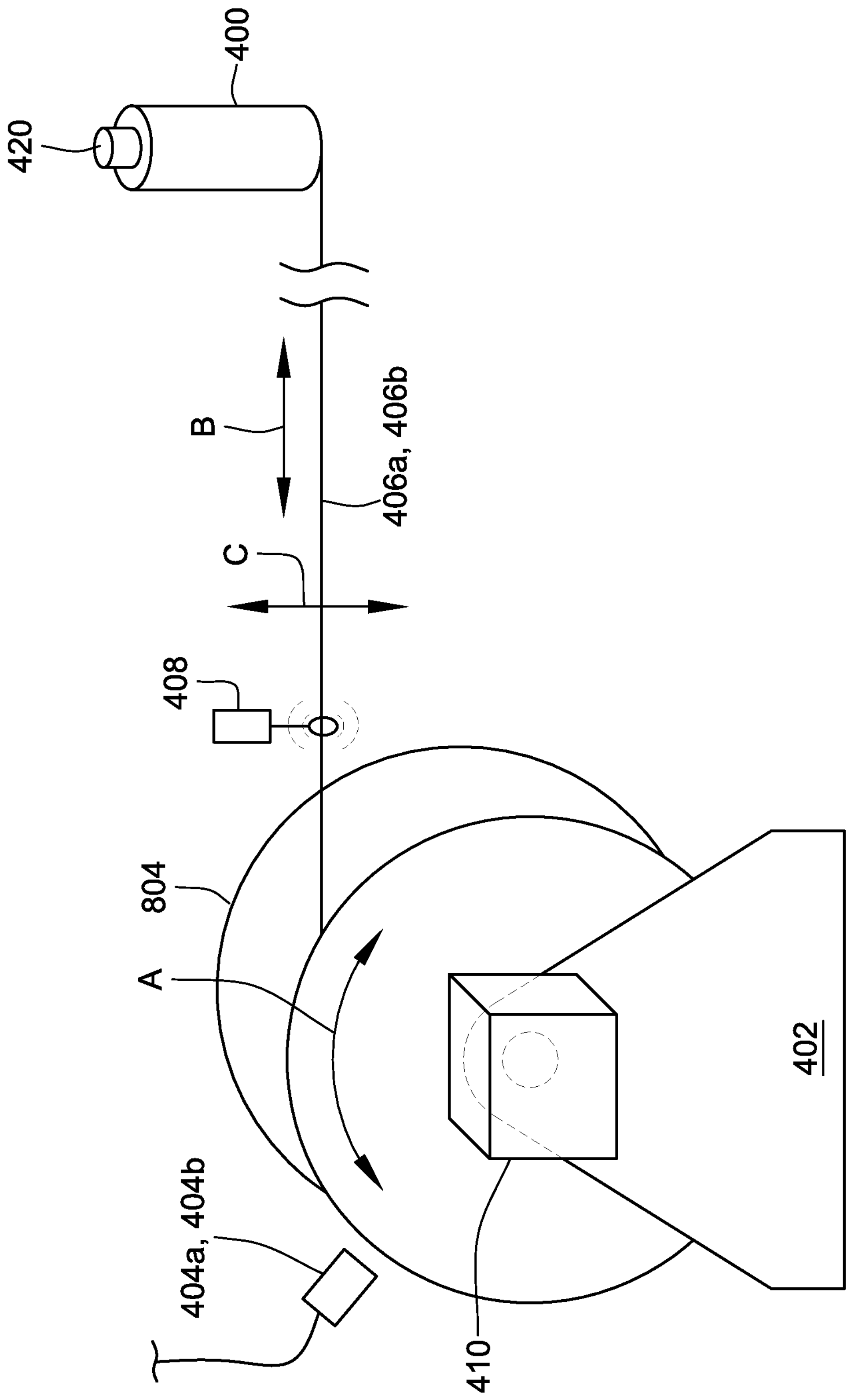
FIG. 9 is a functional diagram of a handheld device connected to a motor that directly drives a reel around which a cable connecting the handheld device to the motor is wound.

FIG. 9 illustrates a different configuration from that shown in FIG. 8 in that the motor 410 is directly coupled to the reel 804, eliminating the need for a rotor or gear. The motor 410 is attached to the fixed structure 402, and the reel 804 is rotated in the direction of arrow A by the motor 410, which in turn moves the handheld device 400 toward or away from the fixed structure 402 along the direction indicated by arrow B. An optional haptic feedback device 408 can be physically or mechanically coupled to the cable 406 to cause the cable to vibrate along a direction indicated by arrow C. Only the movement of the cable 406 is affected; the handheld device 400 is not moved significantly by the vibration of the haptic feedback device 408 in this illustrated example. A small movement along the direction B might occur when the cable is vibrated along the direction C, but this movement would be perceived as vibrations as the user grasps the handheld device 400. The sensor 404 is positioned and configured to sense a distance that the cable 406 travels as it is urged toward or away from the fixed structure 402.

Referring now to FIG. 10, which appears on the same page as FIG. 13C, an example configuration 1000 is shown with two gaming terminals 10 side by side and separated by a spacer 1002, which acts as a fixed structure 402. The spacer 1002 has a housing 1004 that is distinct from the cabinet 11 of the gaming terminal 10. The handheld device 400 is connected to the cable 406, which is connected to a fixed structure in the spacer 1002. The reel 804 and the motor 410 can be housed inside the housing 1004 of the spacer 1002. This configuration 1000 allows multiple gaming terminals 10 to share one handheld device 400, or provides a separate structure for the handheld device 400 and the motor 410 without having to retrofit or modify existing gaming terminals 10. The spacer 1002 can include a connector that connects to the gaming terminal 10 to which the handheld device 400 is associated for passing inputs from the handheld device 400 to the gaming terminal 10 or providing haptic feedback signals from the gaming terminal 10 to the handheld device 400 via the cable 406. Alternately, the handheld device 400 can wirelessly communicate with the gaming terminal 10 or the external system 48 via its wireless communications interface 412, eliminating the need for any physical connections between the spacer 1002 and the gaming terminal 10.

FIGS. 11A-11D illustrate a sequence of actions by the handheld device 400 and corresponding graphical animations that are influenced by the detected actions of the handheld device 400. A graphic 1102, in this example a fish, can correspond to a symbol of the wagering game portrayed on the primary display area 12 or the secondary display area 14. In these illustrations that follow, no distinction is made between the two display areas 12, 14, and the graphics can be displayed on either or both or spanning across both areas. Furthermore, like reference numbers refer to components or modules previously described, and for ease of discussion their description will not be repeated here. Moreover, any components or modules shown are merely exemplary and in other implementations can be eliminated. For example, the second motor 410*b* need not be used, and likewise the reel 804, sensor 404, and the haptic feedback device 408 are optional as well. The motor 410 can be directly coupled to the reel 804 as described in FIG. 9 instead of as shown. All of these variations apply to any of the implementations described herein.

The graphic 1102 can represent a symbol that a player of the wagering game holding the handheld device 400 desires to capture using the handheld device 400. In this example, the handheld device 400 appears to be controlling a fishing line graphic 1104, which is attached to a hook graphic 1106. By pushing or pulling the handheld device 400, the hook graphic 1106 can be made to appear as if being influenced by the pushing or pulling action. For example, in FIG. 11A, the handheld device 400 is urged toward the reel 804 along the direction indicated by the arrow A. The player can either move the handheld device 400 toward the reel 804, which causes the motor 410*a* to take up the slack in the cable 406, or the motor 410*a* can rotate the reel 804 to cause the cable 406 to be wound around the reel 804, thereby pulling the handheld device 400 toward the reel 400. This action by the handheld device 400 can simulate a "casting" action in which the player casts the fishing line represented by the graphic 1104 into the water.

Figure 11A:
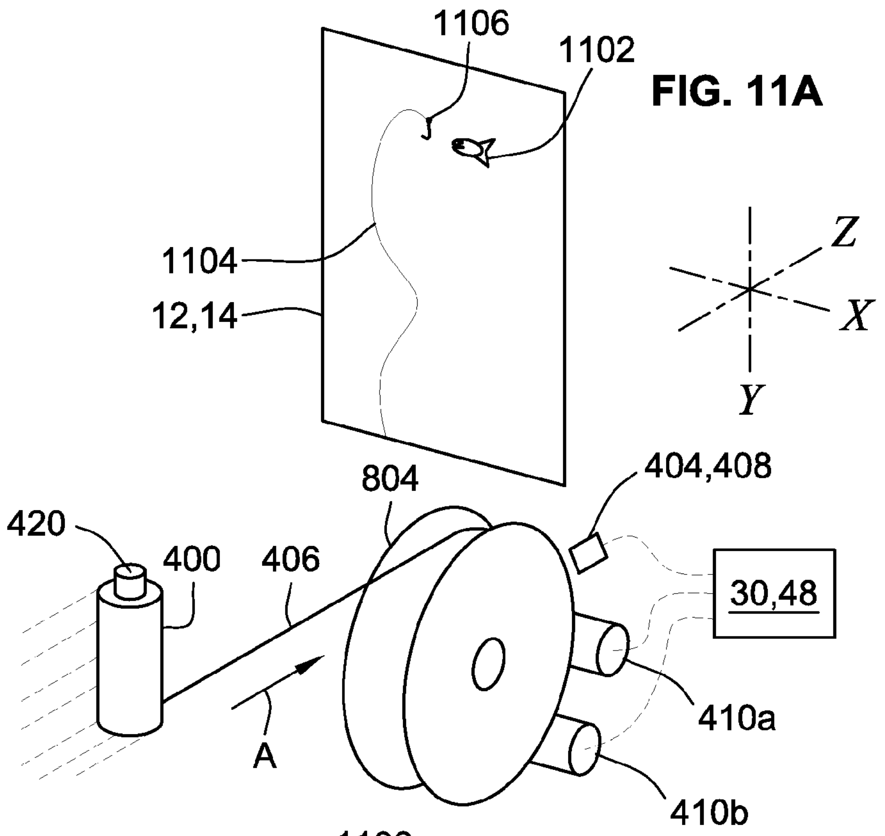
FIGS. 11A-11D are illustrations of a sequence of movements by a handheld device connected by one cable and corresponding graphics displayed on one or more display areas.
Figure 11B:
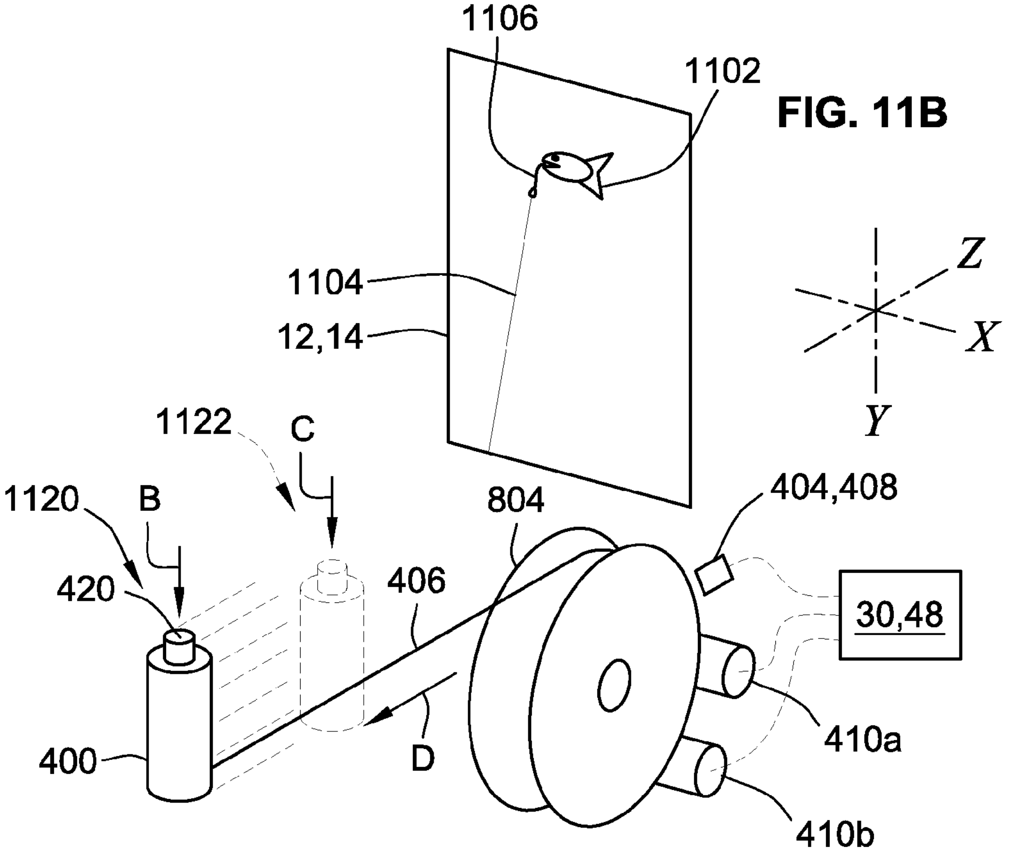

In FIG. 11B, the player has hooked a fish 1102 with the hook 1106 by pressing the button 420 in the direction indicated by the arrows B and C while also tugging or pulling the handheld device 400 away from the reel 804. When the fish 1102 is made to appear to swim within hooking distance of the hook 1106, the player can depress the button 420 and jerk the handheld device 400 away from the reel 804 in the direction indicated by the arrow D, causing the cable 406 to extend while the position sensor 404 detects the distance of cable that is unwound from the reel 804. The fish 1102 can be associated with a game outcome of the wagering game, such as an award or eligibility to play a bonus game or to participate in a community game.

Figure 11C:
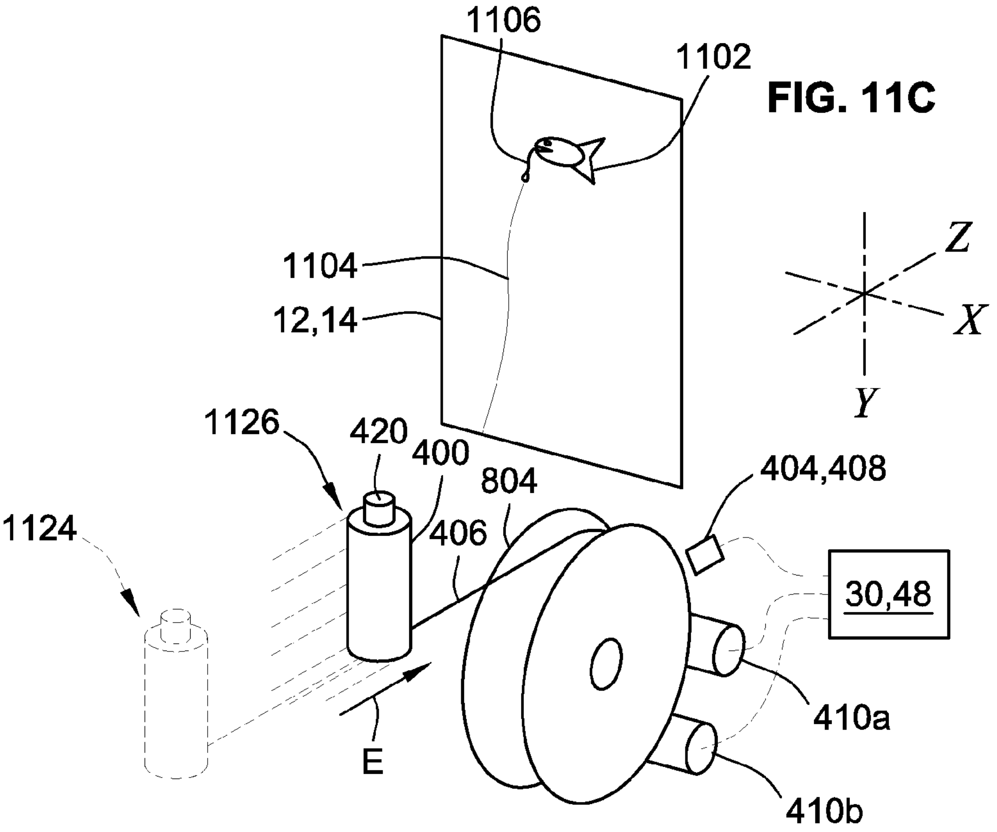

In FIG. 11C, the fish 1102 is trying to swim away to escape the hook 1106, causing the handheld device 400 to be pulled toward the reel 804 by action of the motor 410*a* operating on the reel 804 to rotate the reel 804 in a direction that causes the cable 406 to be wound around the reel 804. In this part of the sequence, the fish 1102 attempts to escape from the hook 1106 to deprive the player of the potential prize or award associated therewith. In wagering games, the outcomes are randomly determined according to an algorithm that meets regulatory requirements. In quasi-skilled-based wagering games that appear to rely on the player's skill to achieve an award, environmental factors can be introduced to direct the player to the predetermined outcome notwithstanding any skill by the player. Thus, the fish 1102 pulling away can eventually escape from the hook 1106 if the already-determined random outcome does not correspond to a winning outcome. This represents an environmental factor that can be introduced into the wagering game to ensure that whatever randomly determined outcome is associated with the inputted wager is ultimately realized. The player can chalk losing the fish 1102 up to the vagaries of fishing without feeling as if a lack of skill or poor skill contributed to losing the potential award. Alternately or additionally, having the fish 1102 attempt to swim away with the hook 1106 while pulling the handheld device 400 along with it adds an element of realism that reflects a real-world fishing experience.

Figure 11D:
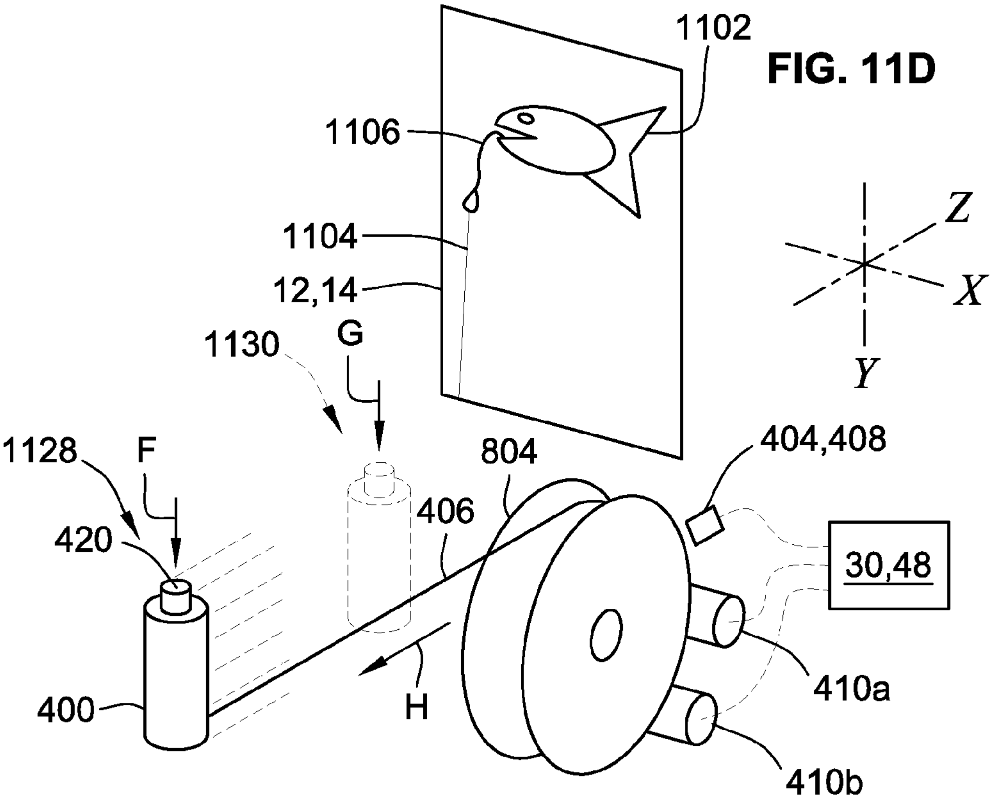

However, in FIG. 11D, the player's luck has turned, and the player has managed to keep the fish 1102 hooked on the hook 1106 by pulling on the handheld device 400. Optionally, the wagering game can require that the player continue to depress the button 420 (indicated by arrows F and G) to indicate that the player still desires this fish 1102. If the player releases the button 420 while reeling in the fish 1102, in some implementations, the fish 1102 can appear to become unhooked from the hook 1106 and swim away freely. In other implementations, the player is not required to press the button 420. To reel in the fish 1102, the player pulls back on the handheld device 400 in the direction indicated by the arrow H, thereby unwinding the cable 406 from the reel 804. The motor 410*a* can rotate in a direction opposite to the pulling direction to apply a force opposing the tugging or pulling motion by the handheld device 400. The haptic feedback device 408 can impart haptic feedback to the cable 406 as the player is attempting to reel in the fish 1102, which can simulate the wriggling and writhing of the fish 1102 as it attempts to escape or fight against being reeled in.

Although a fishing theme example has been shown and described in connection with FIGS. 11A-11D, this fishing theme example can be extended to any theme that involves pulling motions by a human and countervailing tugging motions by an object away from the human, such as action-reaction scenarios or cause-effect scenarios. It should be understood that the present disclosure is not limited to a fishing theme, but rather this theme has been illustrated and described to exemplify a usage of the handheld device 400 in conjunction with display areas 12, 14. For example, to initiate a spin of reels in a slot wagering game, the handheld device 400 can be pulled like a lawnmower starter to simulate a slot handle pull. The force with which the handheld device 400 is pulled can be related to or commensurate with the speed at which the reels rotate. Another action-reaction example is a bow-and-arrow theme in which the handheld device 400 is pulled back to apply tension to the bow, and the button 420 is pressed to release the arrow toward a target of the wagering game.

In some implementations, the range of detectable motion of the handheld device 400 can be confined to a predetermined space in front of the gaming terminal 10 to discourage the player holding the handheld device 400 from extending the range of motion into an adjacent player's space or from accidentally striking a neighboring player at an adjacent gaming terminal. The optional inertial sensor(s) 418 can be used to determine an out-of-bounds condition of the handheld device 400, or external sensors can be used to detect when the handheld device 400 extends beyond a predetermined zone or area, causing the functionality of the handheld device 400 to be disabled until the handheld device 400 is returned to the predetermined zone or area where its inputs are detected and processed. The motor 410 can be used to reel in the cable 406 when the handheld device 400 is detected to be out of the predetermined zone or area. Alternately, only certain motions with the handheld device 400 can be accepted by the wagering game. The amount of cable 406 that is allowed to be released from the reel 408 can also be controlled to restrict a range of motion of the handheld device 400. For example, up/down motions can be accepted as inputs, whereas side-to-side motions are ignored to discourage players from swinging the handheld device 400 from side to side where it might impinge their neighbor's space.

In still other implementations, play of the wagering game can require that the handheld device 400 always be in tension such that the player is required to maintain a pulling force on the handheld device 400 so that the cable 406 is pulled away from the motor 410. The motor 410 counteracts the pulling force by rotating in a direction opposite the pulling force. So long as this force is maintained, in these examples, play of the wagering game is permitted. If the tension stops being applied, such as when the player drops the device 400, game play of the wagering game can be stopped. The button 420 can be used to make inputs on the wagering game.

FIGS. 12A-12D illustrate another example sequence involving a handheld device 400 that is connected to two cables 406*a*, 406*b* that is used to control a direction, pitch, yaw, and/or roll (generally, a movement) of a kite in a kite flying theme of a wagering game. A kite graphic 1202 is displayed along with a target graphic 1208 that can be associated with a randomly determined winning outcome or with a randomly determined non-winning outcome. Thus, the target graphic 1208 can represent a target that the player desires to hit because it represents a potential winning outcome or that the player desires to avoid because it represents, for example, a terminator that terminates the wagering game, such as a bonus game. Either way, the handheld device 400 is used to control a movement of the kite 1202 in at least two directions along a plane or in three dimensional space. Like reference numbers refer to like components or modules. Reels 1204*a* and 1204*b* are based on the reel 804 described in connection with FIG. 8 above.

Figure 12A:
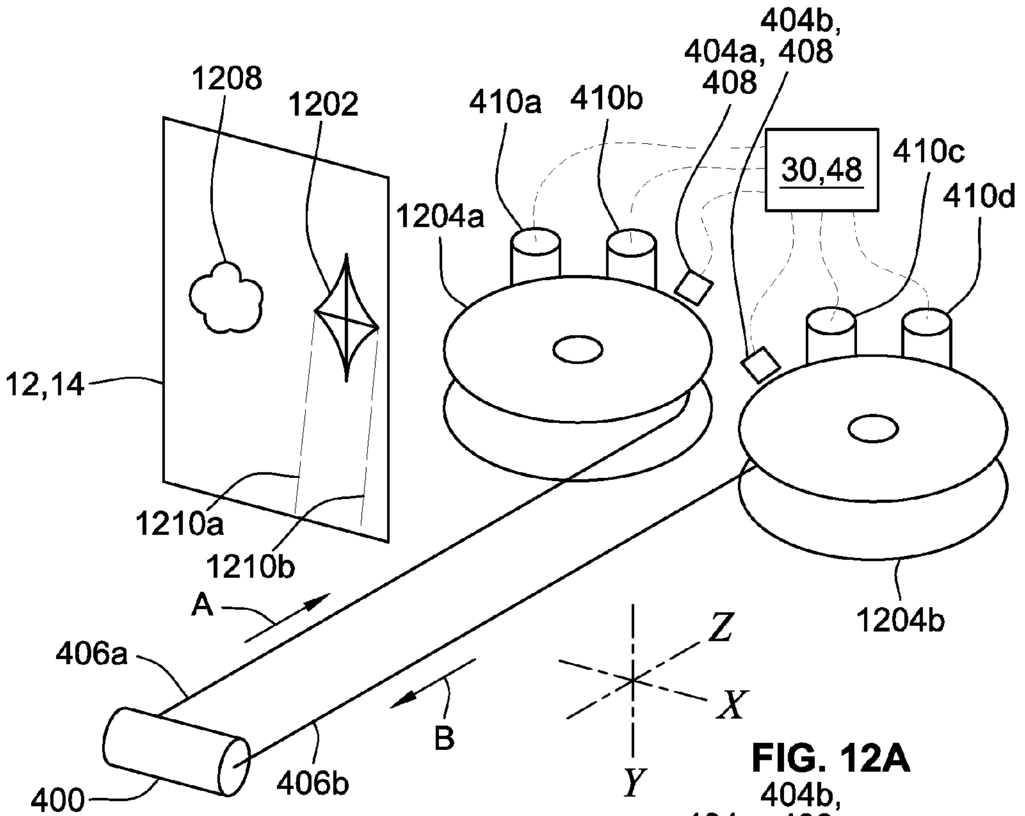
FIGS. 12A-12D are illustrations of a sequence of movements by a handheld device connected by two cables and corresponding graphics displayed on one or more display areas.

In the first example, shown in FIG. 12A, the player turns or twists the handheld device 400 such that the first cable 406*a* is urged toward a first reel 1204*a* along a direction indicated by arrow A, such as by being reeled in by the first motor 410*a*, while at the same time causing the second cable 406*a* to be urged away from the second reel 1204*b* along a direction indicated by arrow B, which is opposite the direction indicated by arrow A. In other words, the cables 406*a*, 406*b* are urged in opposite directions from one another. This movement by the handheld device 400 can control, for example, a direction, a pitch, a yaw, or a roll of the kite 1202. The direction, pitch, yaw, or roll of the kite 1202 is altered as displayed on the display areas 12 or 14 in a manner that corresponds with the movement of the handheld device 400. The optional haptic feedback device(s) 408 can simulate wind or fluttering of the kite on the handheld device 400, which can represent a kite handle. Two kite line graphics 1210*a*, 1210*b* correspond to the cables 406*a*, 406*b* connected to the handheld device 400.

Figure 12B:
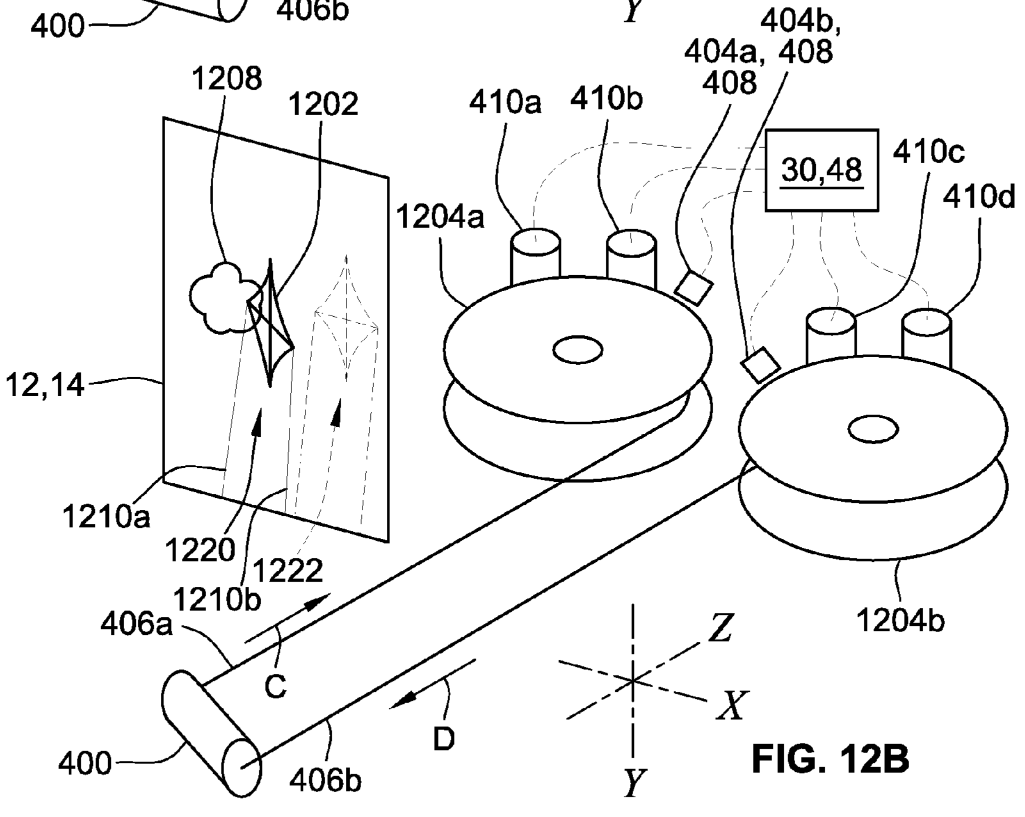

In FIG. 12B, the twisting motion of the handheld device 400 that causes the cables 406*a*, 406*b* to move in opposite directions indicated by the opposite-going arrows A and B causes the kite 1202 to move toward the target 1208 from an original position 1222 to a new position 1220 and appear to interact with the target 1208. When the target 1208 corresponds to a winning outcome, the winning outcome can be presented to the player. When the target 1208 corresponds to a terminator, the wagering game, such as a bonus game, can terminate when the kite 1202 appears to hit the target 1208.

Figure 12C:
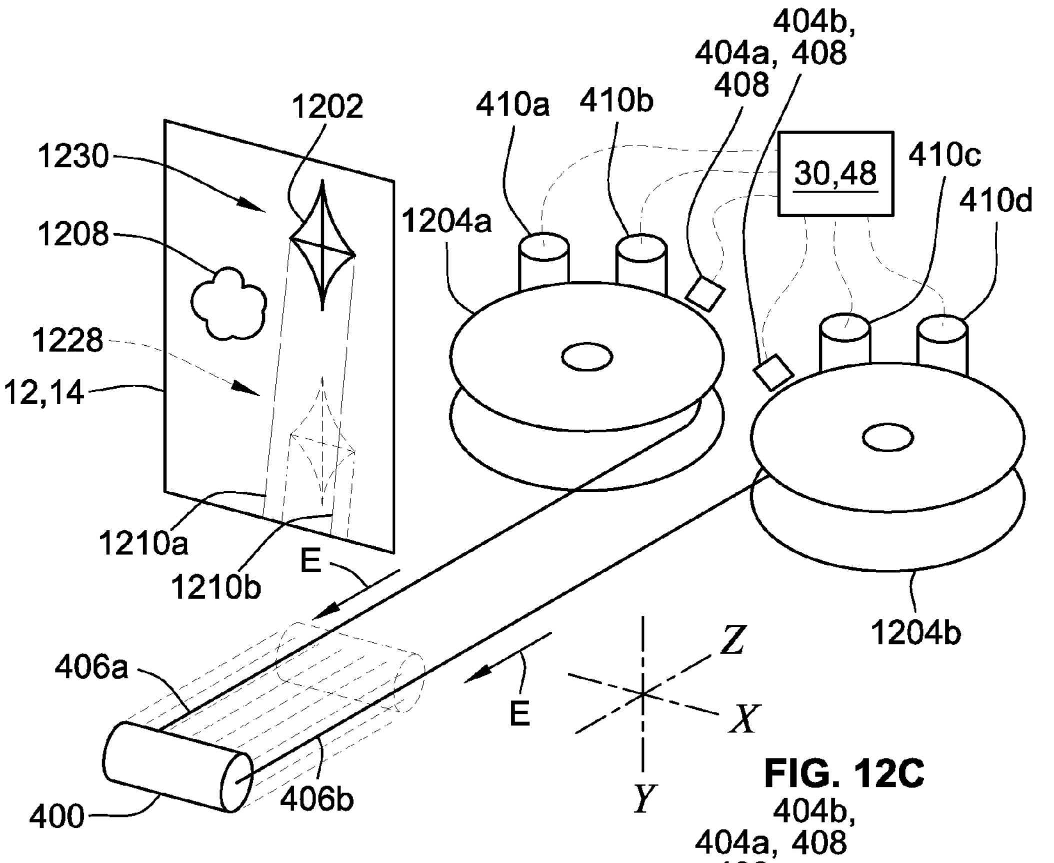
Figure 12D:
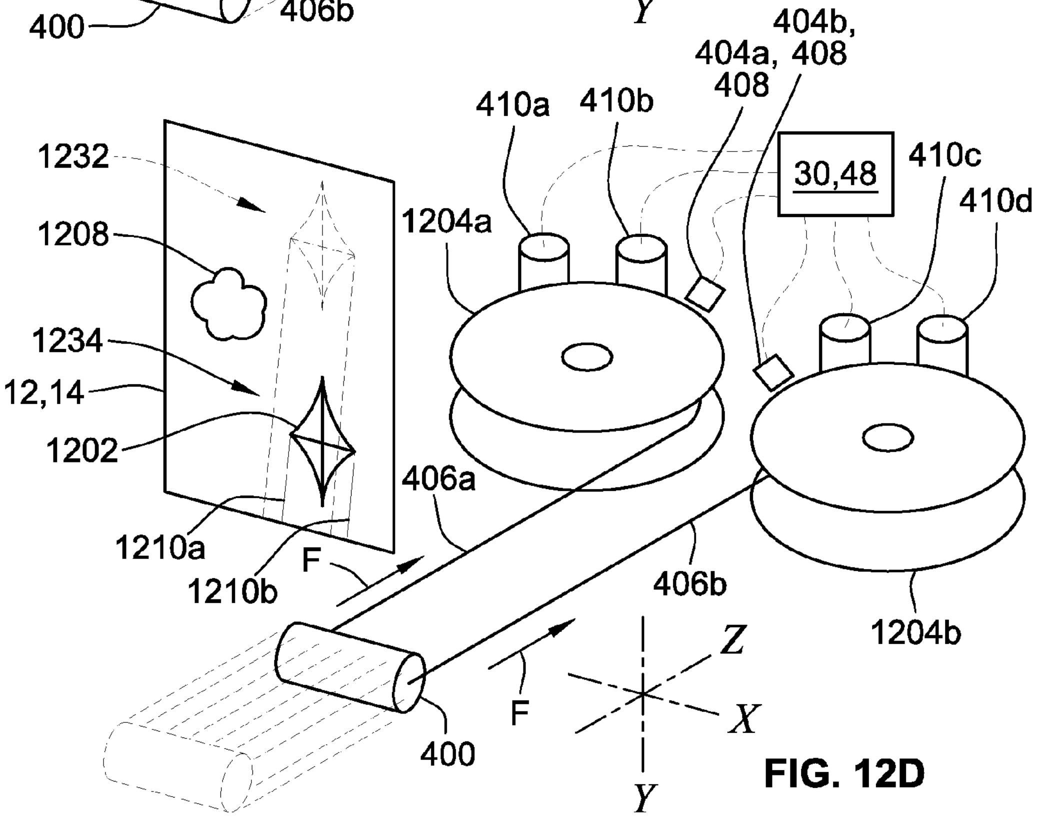

FIGS. 12C and 12D illustrate how moving both cables 406*a*, 406*b* can control a different aspect of the kite 1202. Thus, in FIG. 12C, by urging both cables 406*a*, 406*b* simultaneously away from the motors 410*a*, 410*c*, the kite 1202 can be made to appear to move in an upward direction from an original position 1228 to a new position 1230 at a higher point in the sky. By contrast, urging both cables 406*a*, 406*b* simultaneously toward the motors 410*a*, 410*c* causes the kite 1202 to appear to move in a downward direction from an original position 1232 to a new position 1234 at a lower point in the sky. Haptic feedback by the haptic feedback device(s) 408 can be imparted to one or both of the cables 406*a*, 406*b* to simulate, for example, wind or fluttering of the kite. The wind can represent an environmental factor, as discussed above, that can take the kite 1202 off a course intended by the player holding the handheld device 400 to cause the predetermined randomly determined outcome to occur, notwithstanding the player's skill in manipulating the kite 1202 with the handheld device 400. In this example, the handheld device 400 can lack the optional button 420. Although two lines 1210*a*, 1210*b* are shown and two cables 406*a*, 406*b* are connected to the handheld device 400, in other implementations, more than two cables and lines can be used, such as four in the case of a quad-line kite. Again, the kite example is merely exemplary of a usage of the handheld device 400 with multiple cables 406*a*, 406*b* in conjunction with graphics portrayed in the display areas 12, 14.

Figure 13A:
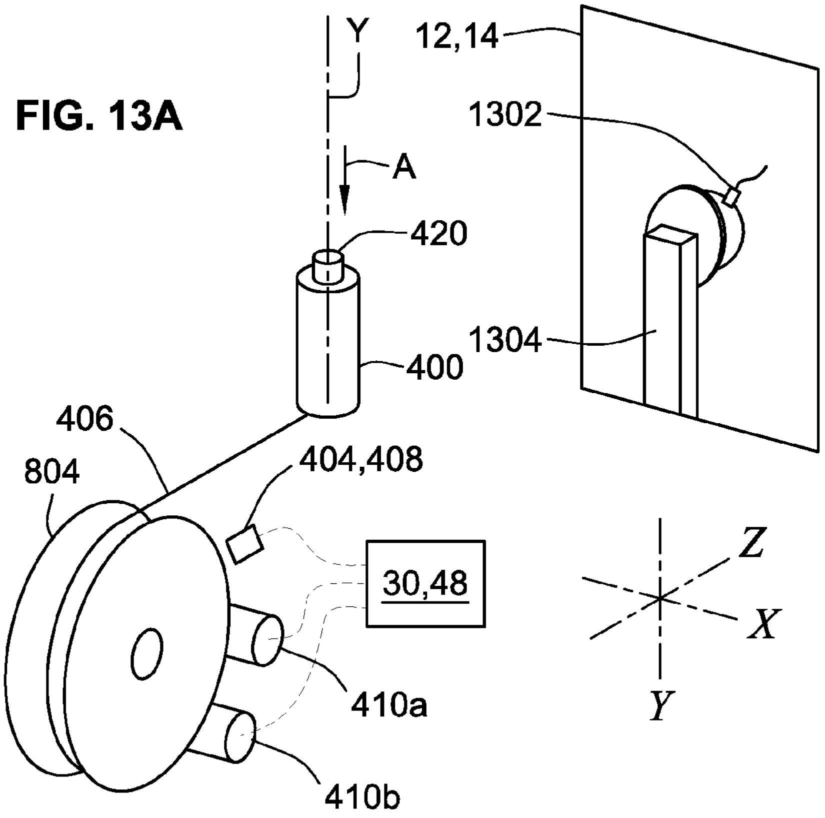
Figure 13B:
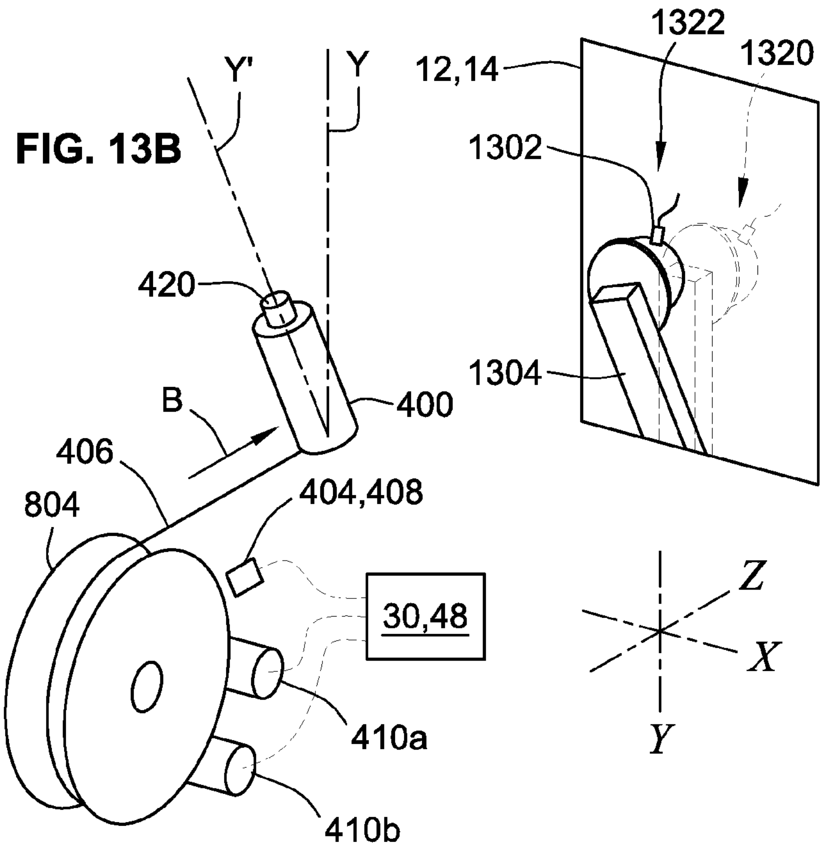

FIGS. 13A-13C illustrate another sequence using a handheld device 400 to launch an object 1302 at a target, which can correspond to a symbol of the wagering game. Here, the orientation information, such as detected by the optional inertial sensor(s) 418 in the handheld device 400, is used to control a catapult arm 1304 that is prepared to launch the object 1302. The player can position the handheld device 400 initially in a vertical (relative to earth) upright position along the Y axis as shown in FIG. 13A. To cock the catapult arm 1304 into a launch position, the player can rotate the handheld device 400 backwards from the axis Y to a new axis Y' while also pulling the handheld device 400 away from the motor 410*a* as shown in FIG. 13B. Concurrently, haptic feedback can be imparted along the cable 406*a* to simulate the tension created as the catapult arm 1304 is locked into launch position. Finally, in FIG. 13C, the player depresses the button 420 to release the object 1302 toward the target, which like the target 1208 shown in the kite-flying example of FIGS. 12A-12D, can correspond to a winning outcome or a non-winning outcome. Wind, flying birds, or other environmental factors can alter the trajectory of the object 1302 to ensure that the object 1302 hits the target associated with the randomly selected outcome. Note that the position of the handheld device 400 relative to the reel 804 can be reversed from the relative positions shown in FIG. 13A-13C. In other words, instead of the reel 804 being positioned behind the handheld device 400, in alternate implementations, the reel 804 can be positioned in front thereof, such as shown in FIGS. 12A-12D.

Figure 14:
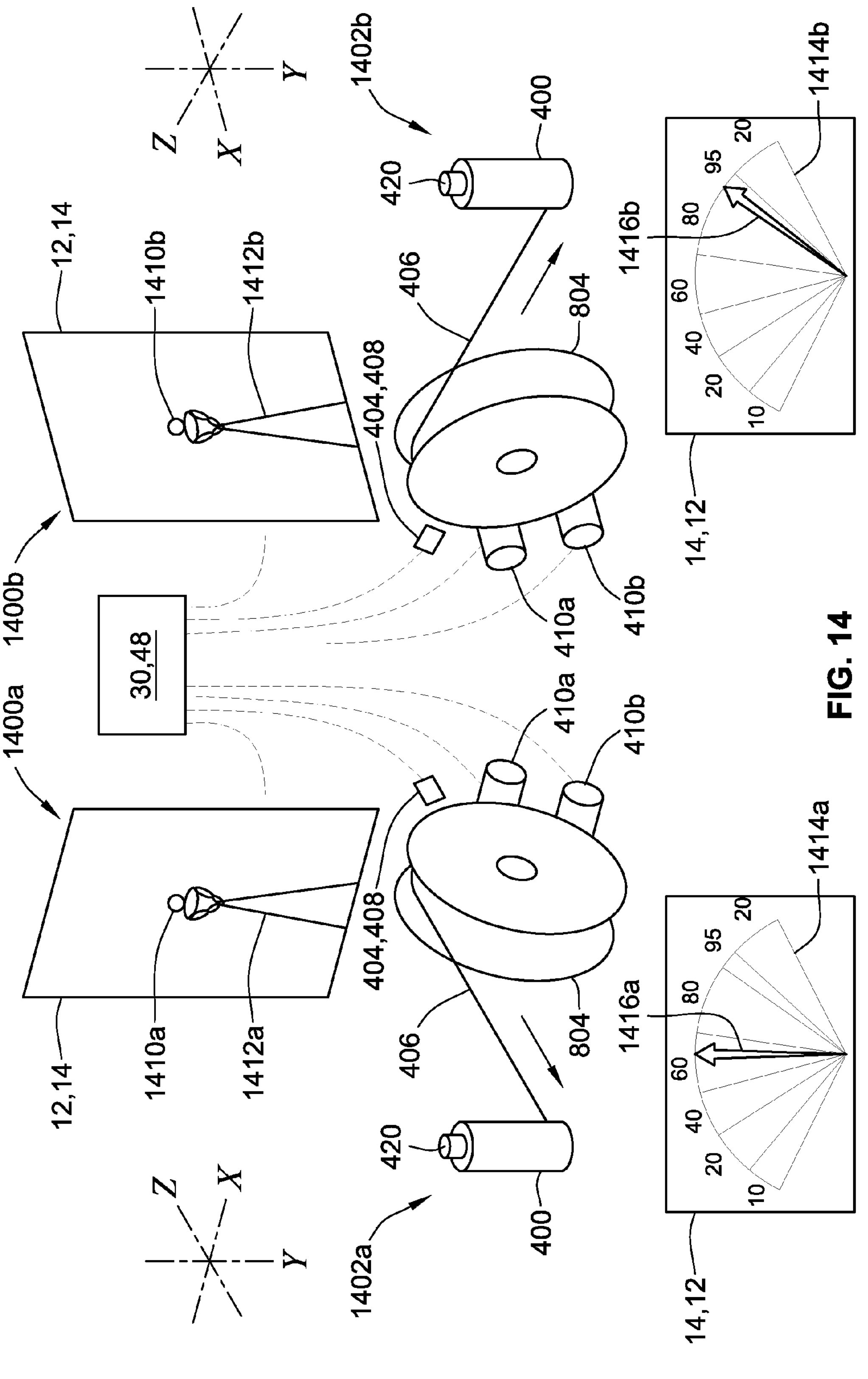
FIG. 14 is an illustration of a sequence of a two-player wagering game in which two players each pull a corresponding handheld device to compete against one another or cooperate with one another to achieve an award.

FIG. 14 illustrates an example of a multi-player tug-of-war themed wagering game in which a first player grasping a first handheld device 1402*a* and a second player grasping a second handheld device 1402*b* simultaneously pull on their respective devices 1402*a*, 1402*b* to accomplish either a common objective or to compete against one another to achieve an award for the winning player. In this example, the tug-of-war theme represents a competitive multi-player wagering game, where one player tries to apply a greater pulling force than the other. Both handheld devices 1402*a*, 1402*b* are based on the handheld device 400 described above. The primary or the secondary display areas 12, 14 on the respective gaming terminals 1400*a*, 1400*b* each displays a corresponding avatar 1410*a* or 1410*b* representing the first and second players, respectively. The other of the primary or secondary display areas 14, 12 display a respective power meter 1414*a*, 1414*b* with an indicator 1416*a*, 1416*b* (shown as an arrow graphic) that indicates how much force is being associated with the pulling action of the handheld device 1402*a* or 1402*b*. To discourage players from yanking on the handheld devices 1402*a*, 1402*b* with excessive force, the power meters 1414*a*, 1414*b* can include a penalty area when too much force is exerted. Thus, the first player's power meter 1414*a* displays in real time an amount of force in percentages on the display area 14 or 12, and the arrow 1416*a* indicates that at present the first player is applying a force representing 60% of a maximum force to the handheld device 1402*a*. As the first player 1402*a* pulls harder, the arrow 1416*a* moves to the right, and the "sweet spot" or point of maximum force is 95%. However, if the first player pulls too hard, the force drops precipitously to 20%, eliminating almost any advantage that the first player may have enjoyed in the game. By contrast, the second player is applying the maximum force on the handheld device 1402*b* as shown by the arrow 1416*b* on the power meter 1414*b*. In this competitive multi-player wagering game, the second player would be awarded a randomly determined winning outcome. Haptic feedback can be imparted on one or both cables 406 attached to the handheld devices 1402*a*, 1402*b* as the players are tugging on a virtual rope 1412*b* to simulate vibrations transmitted along the rope 1412*b* as the players pull the rope 1412*b* in opposite directions.

In a cooperative multi-player wagering game, such as a water ski game where the players try to balance on a water ski through a set of targets or a rowing game where both players attempt to steer a boat toward a target as fast as possible, the same power meters 1414*a*, 1414*b* can be used to discourage excessive pulling on the handheld devices 1402*a*, 1402*b*. In a cooperative game, if both players successfully steer the boat to a target, both players can be awarded an award. As the players pull on the handheld devices 1402*a*, 1402*b*, the corresponding motors 410*a*, 410*c* can rotate to impart an opposing force to the pulling motion or wind up any slack in the cable 406 around the corresponding reel 804. In another example, if a player pulls too hard on the handheld device 1402*a*, 1402*b*, the motor 410*a*, 410*c* can slip suddenly, causing a sudden slack in the cable 406, and the player's participation in the wagering or multi-player wagering game can be terminated and optionally the wager inputted by the player can be returned to the player.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system, comprising:
- a fixed structure;
- an input device;
- one or more display devices;
- a processor;
- a memory device storing instructions that, when executed by the processor or another processor, cause the gaming system to receive, via at least one of the one or more input devices, an input indicative of a wager and to display, via the one or more display devices, at least a portion of a wagering game;
- a handheld device connected to a first cable that is coupled to the fixed structure via a first motor, the first motor operable to apply a tension to the first cable that causes the first cable to be urged toward the fixed structure and away from an opposing pulling force applied to the handheld device;
- a first sensor coupled to the first cable or to the handheld device and configured to sense at least one of a movement or an orientation of the handheld device; and
- a haptic feedback device physically or mechanically coupled directly to the first cable, the haptic feedback device being configured to, under control of the processor or another processor of the gaming system, impart haptic feedback to the first cable that is transmitted by the first cable to the handheld device while the first motor applies the tension, the haptic feedback causing the first cable to vibrate in a manner that includes a direction generally orthogonal to the first cable.

2. The gaming system of claim 1, wherein the instructions further cause the gaming system to impart the haptic feedback simultaneously with the first sensor sensing the movement of the handheld device.

3. The gaming system of claim 2, wherein the instructions further cause the gaming system to display on the one or more display devices a graphic related to the wagering game and whose movement appears to be influenced by the movement of the handheld device, the movement of the graphic being coordinated with the movement of the handheld device.

4. The gaming system of claim 3, wherein the graphic is a symbol associated with a randomly determined outcome of the wagering game, or wherein the graphic represents an object that interacts with a symbol of the wagering game, the symbol being associated with a randomly selected outcome of the wagering game.

5. The gaming system of claim 1, wherein the first cable is retractable, the first motor being coupled to a first take-up reel around which the first cable is wound as the first motor rotates the first reel or is unwound as the handheld device is pulled.

6. The gaming system of claim 5, wherein the first motor is configured to rotate against a direction in which the first cable is being pulled to resist a pulling force applied on the first cable by the handheld device.

7. The gaming system of claim 1, the instructions causing the gaming system to rotate the first motor between a first direction and a second direction opposite the first direction to impart haptic feedback along the first cable to the handheld device.

8. The gaming system of claim 1, wherein the fixed structure is a cabinet of a gaming terminal, the gaming terminal housing the input device and the display device, or wherein the fixed structure is a spacer adjacent to a cabinet of a gaming terminal that houses the input device and the display device, the spacer having a housing that is distinct from the cabinet of the gaming terminal.

9. The gaming system of claim 1, wherein the first sensor is an inertial sensor in the handheld device, the orientation of the handheld device being detected by the inertial sensor and communicated to the processor or another processor of the gaming system.

10. The gaming system of claim 9, wherein the orientation is communicated along the first cable from the handheld device toward the processor or another processor of the gaming system.

11. The gaming system of claim 1, wherein the handheld device includes a base and a top section that articulates about a pivot coupled to the base, the handheld device further including a plurality of sensors coupled to corresponding cables such that articulation of the top section about the pivot causes tension to be applied to selected ones of the cables to detect, via the sensors, a pulling or a pushing motion applied to the top section.

12. The gaming system of claim 1, further comprising a second cable connected to the handheld device and a second sensor coupled to the second cable, wherein the instructions further cause the gaming system to display on the display device a graphic, cause the graphic to appear to move according to a first movement in response to the first and the second cables being urged in the same direction as sensed by the first and second sensors, cause the graphic to appear to move according to a second movement different from the first movement in response to the first and the second cables being urged in opposite directions as sensed by the first and second sensors, the gaming system further comprising a second motor coupled to the second cable and a second take-up reel around which the second cable is wound as the second motor rotates the second reel or is unwound as the handheld device is pulled, wherein the first and second cables are urged in the same direction by the first motor and the second motor rotating in a direction that causes the first and second cables to be wound around respective ones of the first and the second take-up reels.

13. The gaming system of claim 1, wherein the instructions further cause the gaming system to display a graphic on the display device, and to cause the graphic to appear to move according to the movement of the handheld device sensed by the first sensor.

14. The gaming system of claim 1, wherein the graphic corresponds to a symbol of the wagering game, the symbol being associated with a randomly determined outcome of the wagering game.

15. The gaming system of claim 1, wherein the handheld device includes a button, the instructions further causing the gaming system to receive an indication of a press of the button as an input to the wagering game, wherein the instructions further cause the gaming system to display on the one or more display devices a graphic whose movement is influenced by a pushing or pulling of the handheld device relative to the fixed structure until the indication of the press of the button is received, thereby selecting the graphic or another symbol of the wagering game.

16. The gaming system of claim 1, wherein the instructions further cause the gaming system to detect, using the first sensor, when the movement of the handheld device causes the handheld device to be outside a predefined zone, and responsive thereto, terminate play by a player grasping the handheld device of the wagering game.

17. The gaming system of claim 1, wherein the instructions further cause the gaming system to detect, using the first sensor, a constant tension applied to the first cable by the handheld device as a requirement to play the wagering game, and responsive to detecting a loss of the tension, cause the gaming system to terminate the play of the wagering game.

18. A method of imparting haptic feedback along a cable connected to a handheld device used to play a wagering game on a gaming terminal, the method comprising the steps of:

coupling a first cable to a fixed structure;

connecting the first cable to the handheld device;

receiving, using a controller, an input indicative of a wager to play the wagering game;

sensing a movement or an orientation of the handheld device using a first sensor coupled to the first cable or to the handheld device;

causing the wagering game to be displayed on one or more display devices;

imparting haptic feedback, using the controller or another controller, to the first cable during the wagering game such that the haptic feedback is transmitted by the first cable to the handheld device; and terminating play of the wagering game responsive to the movement of the handheld device causing the handheld device to be outside a predefined zone or responsive to detecting a loss of a constant tension applied to the first cable, the constant tension being a requirement to play the wagering game.

19. The method of claim 18, wherein the haptic feedback includes a tension applied to the first cable that causes the first cable to be urged toward the fixed structure and away from an opposing pulling force applied to the handheld device.

20. The method of claim 18, wherein the imparting includes rotating the first motor between a first direction and a second direction opposite the first direction to impart haptic feedback along the first cable to the handheld device.

21. The method of claim 18, wherein the fixed structure is a cabinet of a gaming terminal, the gaming terminal housing the one or more display devices, or wherein the fixed structure is a spacer adjacent to a cabinet of a gaming terminal that houses the one or more display devices, the spacer having a housing that is distinct from the cabinet of the gaming terminal.

22. One or more physical machine-readable storage media including instructions which, when executed by one or more processors, cause the one or more processors to perform operations comprising:

receiving an input indicative of a wager to play a wagering game;

sensing a movement or an orientation of a handheld device by a first sensor coupled to a first cable coupled between a fixed structure and the handheld device or coupled to the handheld device;

causing the wagering game to be displayed on one or more display devices;

responsive to the sensing, imparting haptic feedback to the first cable during the wagering game such that the haptic feedback is transmitted by the first cable to the handheld device; and terminating play of the wagering game responsive to the movement of the handheld device causing the handheld device to be outside a predefined zone or responsive to detecting a loss of a tension applied to the first cable, the tension being a requirement to play the wagering game.

23. A gaming system, comprising:

a fixed structure;

an input device;

one or more display devices;

a processor;

a memory device storing instructions that, when executed by the processor or another processor, cause the gaming system to receive, via at least one of the one or more input devices, an input indicative of a wager and to display, via the one or more display devices, at least a portion of a wagering game;

a handheld device connected to a first cable that is coupled to the fixed structure;

a first sensor coupled to the first cable or to the handheld device and configured to sense at least one of a movement or an orientation of the handheld device; and a haptic feedback device coupled to the first cable, the haptic feedback device being configured to, under control of the processor or another processor of the gaming system, impart haptic feedback to the first cable that is transmitted by the first cable to the handheld device, wherein the instructions further cause the gaming system to terminate play of the wagering game (a) in response to the first sensor detecting that the movement of the handheld device causes the handheld device to be outside a predefined zone, or (b) in response to detecting a loss of tension applied to the first cable by the handheld device, a predetermined tension being required to play the wagering game.

24. The method of claim 23, wherein the haptic feedback includes a tension applied to the first cable that causes the first cable to be urged toward the fixed structure and away from an opposing pulling force applied to the handheld device.

25. The method of claim 23, wherein the imparting includes rotating the first motor between a first direction and a second direction opposite the first direction to impart haptic feedback along the first cable to the handheld device.

26. The method of claim 23, wherein the fixed structure is a cabinet of a gaming terminal, the gaming terminal housing the input device and the one or more display devices, or wherein the fixed structure is a spacer adjacent to a cabinet of a gaming terminal that houses the input device and the one or more display devices, the spacer having a housing that is distinct from the cabinet of the gaming terminal.

* * * * *